United States Patent
De Roeck et al.

(10) Patent No.: US 11,157,186 B2
(45) Date of Patent: Oct. 26, 2021

(54) DISTRIBUTED OBJECT STORAGE SYSTEM WITH DYNAMIC SPREADING

(71) Applicant: Western Digital Technologies, Inc., San Jose, CA (US)

(72) Inventors: Sam De Roeck, Sint-Denijs-Westrem (BE); Arne De Coninck, Erpe-Mere (BE); Stijn Devriendt, Knesselare (BE); Lien Boelaert, Deinze (BE); Annelies Cuvelier, Merelbeke (BE); Frederik De Schrijver, Diksmuide (BE)

(73) Assignee: Western Digital Technologies, Inc., San Jose, CA (US)

( * ) Notice: Subject to any disclaimer, the term of this patent is extended or adjusted under 35 U.S.C. 154(b) by 36 days.

(21) Appl. No.: 16/828,945

(22) Filed: Mar. 24, 2020

(65) Prior Publication Data

US 2020/0401309 A1    Dec. 24, 2020

Related U.S. Application Data

(60) Provisional application No. 62/865,637, filed on Jun. 24, 2019.

(51) Int. Cl.
*G06F 3/06*    (2006.01)

(52) U.S. Cl.
CPC ............ *G06F 3/064* (2013.01); *G06F 3/067* (2013.01); *G06F 3/0617* (2013.01); *G06F 3/0635* (2013.01); *G06F 3/0653* (2013.01); *G06F 3/0659* (2013.01); *G06F 3/0685* (2013.01)

(58) Field of Classification Search
CPC ............................. G06F 3/06–0689
See application file for complete search history.

(56) References Cited

U.S. PATENT DOCUMENTS

| | | | |
|---|---|---|---|
| 8,433,849 B2 | 4/2013 | De Schrijver et al. | |
| 9,135,136 B2 | 9/2015 | De Schrijver et al. | |
| 9,588,862 B2 | 3/2017 | De Keyser et al. | |
| 9,612,952 B2* | 4/2017 | Hayes | G06F 3/0647 |
| 9,860,131 B2* | 1/2018 | Mayer | H04L 41/142 |
| 10,078,552 B2 | 9/2018 | De Keyser et al. | |
| 2008/0077762 A1 | 3/2008 | Scott et al. | |
| 2010/0047451 A1 | 2/2010 | Miura | |
| 2013/0254509 A1 | 9/2013 | Patil et al. | |

(Continued)

FOREIGN PATENT DOCUMENTS

EP    1128254 A2    8/2001

*Primary Examiner* — Nicholas J Simonetti
(74) *Attorney, Agent, or Firm* — Patent Law Works LLP

(57) ABSTRACT

Systems and methods for distributed storage systems using dynamic spreading policies are described. Distributed storage elements may be accessed using various storage paths through hierarchically organized storage system components to store data blocks corresponding to data elements. A higher priority hierarchical spreading policy is selected for determining the storage elements to receive the data blocks. If the first hierarchical spreading policy is determined not to have been met, a lower priority hierarchical spreading policy is selected and the data blocks are stored according to the lower priority hierarchical spreading policy. Data block stored at the lower priority hierarchical spreading policy may automatically be migrated to the higher priority hierarchical spreading policy.

20 Claims, 12 Drawing Sheets

(56) References Cited

U.S. PATENT DOCUMENTS

| | | |
|---|---|---|
| 2014/0250282 A1 | 9/2014 | Yamamoto |
| 2015/0205818 A1* | 7/2015 | Darcy ................. H04L 67/1097 707/822 |
| 2015/0220551 A1 | 8/2015 | Duzly et al. |
| 2016/0018990 A1* | 1/2016 | Yun ....................... G06F 3/0685 711/103 |
| 2018/0107593 A1 | 4/2018 | Ogawa |
| 2020/0028911 A1* | 1/2020 | Sun ......................... G06F 3/067 |

* cited by examiner

DISTRIBUTED OBJECT STORAGE SYSTEM WITH DYNAMIC SPREADING

TECHNICAL FIELD

The present disclosure generally relates to distributed data storage systems and, more particularly, to spreading policies for distributing data blocks across storage elements.

BACKGROUND

Object storage systems are able to surpass the maximum limits for storage capacity of file systems in a flexible way such that for example storage capacity can be added or removed in function of the needs, without degrading its performance as the system grows. This makes such object storage systems excellent candidates for large scale storage systems.

Such large-scale storage systems are required to distribute the stored data objects in the object storage system over multiple storage elements, such as for example disk drives, or multiple components such as storage nodes comprising a plurality of such storage elements. However, as the number of storage elements in such a distributed object storage system increase, equally the probability of failure of one or more of these storage elements increases. To cope therewith it is required to introduce a level of redundancy into the distributed object storage system. This means that the distributed object storage system must be able to cope with a failure of one or more storage elements without data loss. In its simplest form redundancy is achieved by replication, this means storing multiple copies of a data object on multiple storage elements of the distributed object storage system. In this way when one of the storage elements storing a copy of the data object fails, this data object can still be recovered from another storage element holding a copy. Several schemes for replication are known in the art. In general replication is costly as the storage capacity is concerned. This means that in order to survive two concurrent failures of a storage element of a distributed object storage system, at least two replica copies for each data object are required, which results in storage capacity overhead of 200%, which means that for storing 1 GB of data objects a storage capacity of 3 GB is required. Another well-known scheme is referred to as RAID systems of which some implementations are more efficient than replication as storage capacity overhead is concerned. However, often RAID systems require a form of synchronization of the different storage elements and require them to be of the same type and in the case of drive failure require immediate replacement, followed by a costly and time consuming rebuild process. Therefore, known systems based on replication or known RAID systems are generally not configured to survive more than two concurrent storage element failures. Therefore, many distributed object storage systems are based on erasure encoding.

Such a distributed object storage system stores the data object in encoded subblocks that are spread amongst the storage elements in such a way that, for example, a concurrent failure of six storage elements out of minimum of sixteen storage elements can be tolerated with a corresponding storage overhead of 60% (or more, depending on the specific erasure coding scheme), which means that 1 GB of data objects may only require a storage capacity of 1.6 GB for acceptable redundancy.

Further, spreading policies may be enforced in selecting storage elements to receive the subblocks and ensure the subblocks are distributed in fault tolerant ways. Spreading policies may include hierarchical spreading policies that consider points of failure at higher levels than the storage elements, such as failure of a storage node containing multiple storage elements, a storage rack containing multiple storage nodes, storage locations (including different geographic sites), and networking paths connecting these system components.

However, coping with transient states of the distributed storage system (DSS), for example, after new data is written to the DSS, during faults and service interruptions, and until the final desired spreading state is reached, is a problem which is currently not handled optimally. In some cases, it might lead to a reduced level of redundancy, in other cases it might lead to increased latency or use of resources.

SUMMARY

Various aspects for distributed and redundant data block storage, particularly, using hierarchical spreading policies for dynamic spreading of data blocks across storage components are described.

One general aspect includes a storage system that includes a controller configured to: access a plurality of storage elements using a plurality of storage paths through a plurality of hierarchical system components; select, for a selected data element, a first hierarchical spreading policy from a plurality of hierarchical spreading policies for determining a subset of storage elements from the plurality of storage elements to store a plurality of data blocks corresponding to the selected data element; determine, for the selected data element, that the first hierarchical spreading policy has not been met; select, responsive to determining that the first hierarchical spreading policy has not been met, a second hierarchical spreading policy from the plurality; and store, using the second hierarchical spreading policy, the plurality of data blocks corresponding to the selected data element to a selected subset of storage elements from the plurality of storage elements.

Implementations may include one or more of the following features. The storage system may include: an encoder configured to disassemble a data object into a predetermined number of redundant data blocks; a block spreader configured to distribute, using the second hierarchical spreading policy, the predetermined number of redundant data blocks to the plurality of storage elements; a block clusterer configured to retrieve a subset of the predetermined number of redundant data blocks from the plurality of storage elements; and a decoder configured to assemble the data object from the subset of the predetermined number of redundant data blocks. The storage system may include a storage policy engine configured to: store the plurality of hierarchical spreading policies; and assign a priority order for the plurality of hierarchical, where the first hierarchical spreading policy has a higher priority order than the second hierarchical spreading policy. The first hierarchical spreading policy may correspond to availability of the plurality of hierarchical system components at each hierarchy level of a plurality of hierarchy levels, and the second hierarchical spreading policy may correspond to downgraded availability of the plurality of hierarchical system at a selected hierarchy level of the plurality of hierarchy levels. The plurality of hierarchical system components may include at least two types of system components selected from: a storage node; a storage rack; a storage cluster; a storage site; a network switch; a network; a subnetwork; and a storage system. The first hierarchical spreading policy may correspond to a percentage of available storage elements along a first set of storage paths from the plurality of storage paths, the second hierarchical spreading policy may correspond to a percentage of available storage elements along a second set of storage paths from the plurality of storage paths; and the second set of storage paths may include fewer storage paths than the first set of storage paths. The storage system may include a storage manager configured to: attempt to store the plurality of data blocks to the subset of storage elements selected from the plurality of storage elements; and determine a quantity of failed attempts to store the plurality of data blocks using the first hierarchical spreading policy, where the controller determines that the first hierarchical spreading policy has not been met based on the quantity of failed attempts meeting a policy failure threshold. The storage system may include a blacklist engine configured to identify blacklisted storage elements among the plurality of storage elements, where the controller determines that the first hierarchical spreading policy has not been met based on the blacklisted storage elements reducing the plurality of storage elements available below an availability threshold for the first hierarchical spreading policy. The blacklist engine may be further configured to identify blacklisted storage elements based on failure of hierarchical system components, and the controller may determine that the first hierarchical spreading policy has not been met based on failure of at least one hierarchical system component reducing the plurality of hierarchical system components available at a selected hierarchy level below a hierarchical availability threshold for the first hierarchical spreading policy. The controller may be further configured to: disable, based on an operating condition, the first hierarchical spreading policy; store, for each data element stored using the second hierarchical spreading policy, reduced spreading identifiers in metadata; identify each data element with the reduced spreading identifier; and migrate, using the first hierarchical spreading policy, each identified data element to an expanded subset of storage elements from the plurality of storage elements.

Another general aspect includes a computer-implemented method that includes: accessing a plurality of storage elements using a plurality of storage paths through a plurality of hierarchical system components; selecting, for a selected data element, a first hierarchical spreading policy from a plurality of hierarchical spreading policies for determining a subset of storage elements from the plurality of storage elements to store a plurality of data blocks corresponding to the selected data element; determining, for the selected data element, that the first hierarchical spreading policy has not been met; selecting, responsive to determining that the first hierarchical spreading policy has not been met, a second hierarchical spreading policy from the plurality of hierarchical spreading policies; and storing, using the second hierarchical spreading policy, the plurality of data blocks corresponding to the selected data element to a selected subset of storage elements from the plurality of storage elements.

Implementations may include one or more of the following features. The computer-implemented method may further include: storing the plurality of hierarchical spreading policies; and assigning a priority order for the plurality of hierarchical spreading policies, where the first hierarchical spreading policy has a higher priority order than the second hierarchical spreading policy. The first hierarchical spreading policy may correspond to availability of the plurality of hierarchical system components at each hierarchy level of a plurality of hierarchy levels and the second hierarchical spreading policy may correspond to downgraded availability of the plurality of hierarchical system components at a selected hierarchy level of the plurality of hierarchy levels. The plurality of hierarchical system components may include at least two types of system components selected from: a storage node; a storage rack; a storage cluster; a storage site; a network switch; a network; a subnetwork; and a storage system. The first hierarchical spreading policy may correspond to a percentage of available storage elements along a first set of storage paths from the plurality of storage paths, the second hierarchical spreading policy may correspond to a percentage of available storage elements along a second set of storage paths from the plurality of storage paths, and the second set of storage paths may include fewer storage paths than the first set of storage paths. The computer-implemented method may include: attempting to store the plurality of data blocks to the subset of storage elements selected from the plurality of storage elements; and determining that the first hierarchical spreading policy has not been met is based on the quantity of failed attempts meeting a policy failure threshold. The computer-implemented method may include identifying blacklisted storage elements among the plurality of storage elements, where determining that the first hierarchical spreading policy has not been met is based on the blacklisted storage elements reducing the plurality of storage elements available below an availability threshold for the first hierarchical spreading policy. The computer-implemented method may include: identifying blacklisted storage elements among the plurality of storage elements based on failure of hierarchical system components, where determining that the first hierarchical spreading policy has not been met is based on failure of at least one hierarchical system component reducing the plurality of hierarchical system components available at a selected hierarchy level below a hierarchical availability threshold for the first hierarchical spreading policy. The computer-implemented method may include: disabling, based on an operating condition, the first hierarchical spreading policy; storing, for each data element stored using the second hierarchical spreading policy, reduced spreading identifiers in metadata; identifying each data element with the reduced spreading identifiers; and migrating, using the first hierarchical spreading policy, each identified data element to an expanded subset of storage elements from the plurality of storage elements.

Another general aspect includes a system that includes: a plurality of storage elements configured to store a plurality of data blocks; a plurality of hierarchical system components configured to define a plurality of storage paths for accessing the plurality of storage elements; means for accessing the plurality of storage elements using the plurality of storage paths through the plurality of hierarchical system components; means for selecting, for a selected data element, a first hierarchical spreading policy from a plurality of hierarchical spreading policies for determining a subset of storage elements from the plurality of storage elements to store a plurality of data blocks corresponding to the selected data element; means for determining, for the selected data element, that the first hierarchical spreading policy has not been met; means for selecting, responsive to determining that the first hierarchical spreading policy has not been met, a second hierarchical spreading policy from the plurality of hierarchical spreading policies; means for storing, using the second hierarchical spreading policy, the plurality of data blocks corresponding to the selected data element to a selected subset of storage elements from the plurality of storage elements; and means for migrating, using the first hierarchical spreading policy, the plurality of data blocks stored using the second hierarchical spreading policy.

The various embodiments advantageously apply the teachings of distributed storage networks and/or systems to improve the functionality of such computer systems. The various embodiments include operations to overcome or at least reduce the issues previously encountered on the storage networks and/or systems and, accordingly, are more reliable and/or efficient than other computing networks. That is, the various embodiments disclosed herein include hardware and/or software with functionality to improve the management of spreading policies, such as by using a plurality of prioritized hierarchical spreading policies for dynamic spreading of data blocks. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
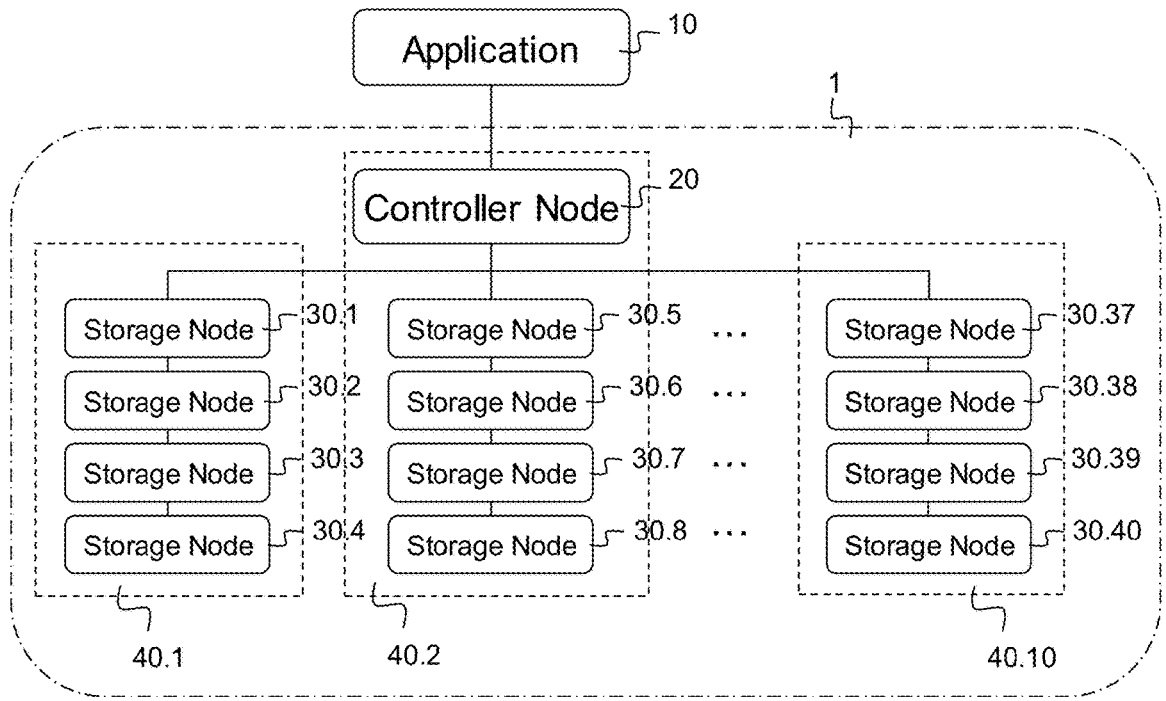
FIG. 1 schematically illustrates a distributed object storage system.

FIG. 1 shows a distributed object storage system 1. It is connected to an application 10 for transferring data objects. This connection may be implemented as a suitable data communication network. Such an application could for example be a dedicated software application running on a computing device, such as a personal computer, a lap top, a wireless telephone, a personal digital assistant or any other type of communication device, that is able to interface directly with the distributed object storage system 1, but said application 10 may alternatively comprise a suitable file system which enables a general purpose software application to interface with the distributed object storage system 1 or an Application Programming Interface (API) library. As further shown in FIG. 1, the distributed object storage system comprises a controller node 20 and a plurality of storage nodes 30.1-30.40 all interconnected in a suitable way for transferring data, for example by means of a conventional data communication network such as a local area network (LAN), a wide area network (WAN), a telephone network, such as the Public Switched Telephone Network (PSTN), an intranet, the internet, any other suitable network or combination of networks. Controller nodes 20, storage nodes 30 and the device comprising application 10 may connect to said data communication network by wired, wireless and/or optical connections.

The distributed object storage system may comprise any other suitable number of storage nodes 30 and for example two three or more controller nodes 20 also connected to these storage nodes 30. These controller nodes 20 and storage nodes 30 can be built as general-purpose computers, however more frequently they are physically adapted for arrangement in large data centers, where they are arranged in modular racks 40 comprising standard dimensions. Particular controller nodes 20 and storage nodes 30, are dimensioned to take up a single unit of such rack 40, which is generally referred to as 1 U.

As shown in FIG. 1 several storage nodes 30 can be grouped together, for example because they are housed in a single rack 40. For example, storage nodes 30.1-30.4; 30.5-30.8; . . . ; and 30.37-30.40 each are respectively grouped into racks 40.1, 40.2, . . . 40.10. Controller node 20 could, for example, be located in rack 40.2. These racks may not be required to be located at the same location, they are often geographically dispersed across different data centers, such as for example rack 40.1-40.3 can be located at a data center in Europe, 40.4-40.7 at a data center in the USA and 40.8-40.10 at a data center in China. Similarly, these racks may be interconnected by a variety of network architectures and may include multiple network paths, global networks (e.g., internet), private networks, virtual networks, subnetworks, etc. and related networking equipment.

Figure 2:
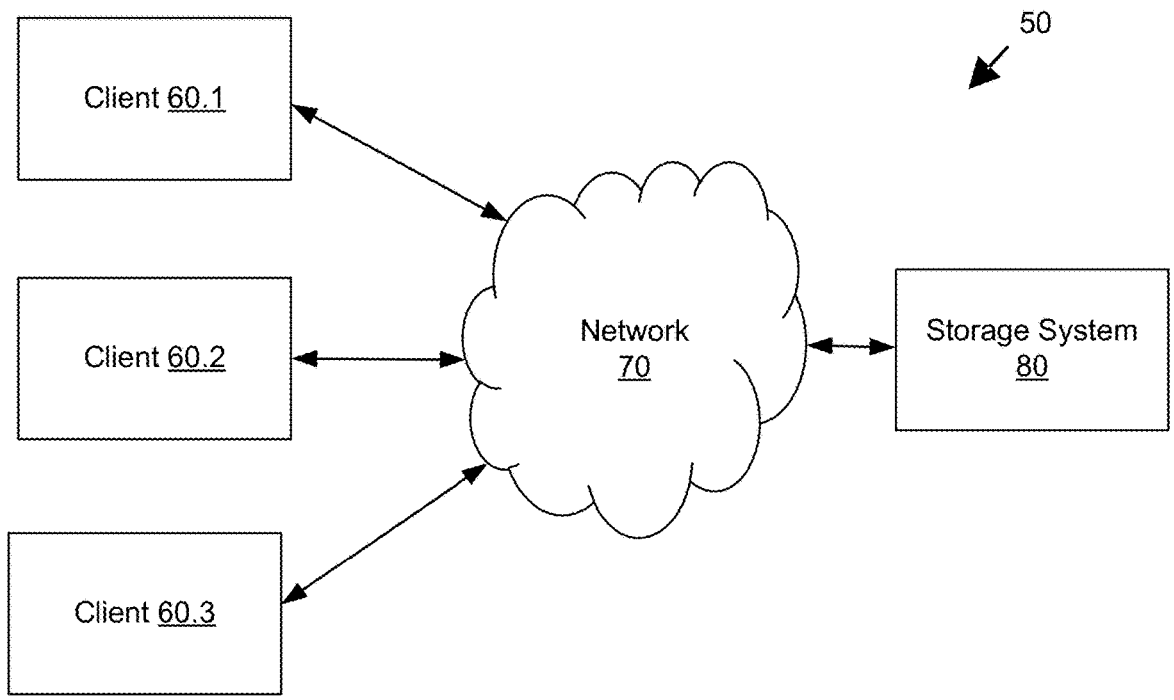
FIG. 2 schematically illustrates a client/server architecture that may be used by the distributed object storage system of FIG. 1.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
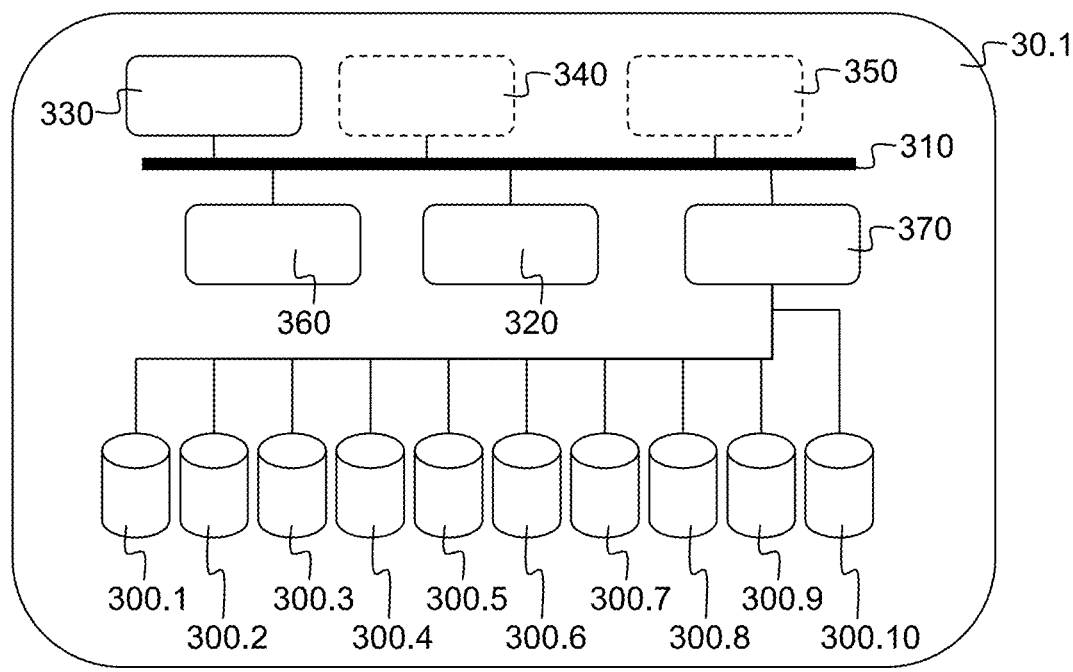
FIG. 3 schematically illustrates a storage node of the distributed object storage system of FIG. 1.

FIG. 3 shows a schematic representation of one of the storage nodes 30. Storage node 30.1 may comprise a bus 310, a processor 320, a local memory 330, one or more optional input units 340, one or more optional output units 350, a communication interface 360, a storage element interface 370 and a plurality of storage elements 300.1-300.10. Bus 310 may include one or more conductors that permit communication among the components of storage node 30.1. Processor 320 may include any type of conventional processor or microprocessor that interprets and executes instructions. Local memory 330 may include a random-access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to said storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or controller nodes 20 such as for example two 1 Gb Ethernet interfaces. Storage element interface 370 may comprise a storage interface such as for example a Serial Advanced Technology Attachment (SATA) interface or a Small Computer System Interface (SCSI) for connecting bus 310 to one or more storage elements 300, such as one or more local disks, for example, 2 TB SATA-II disk drives, and control the reading and writing of data to/from these storage elements 300. As shown in FIG. 3, such a storage node 30.1 could comprise ten 2 TB SATA-II disk drives as storage elements 300.1-300.10 and in this way storage node 30.1 would provide a storage capacity of 20 TB to the distributed object storage system 1. According to FIG. 1 and in the event that storage nodes 30.2-30.40 are identical to storage node 30.1, the distributed object storages system 1 would then have a total storage capacity of 800 TB.

Taking into account FIG. 1 and FIG. 3, the distributed object storage system 1 comprises a plurality of redundant storage elements 300. The storage nodes 30 each comprise a share of these storage elements 300. As shown in FIG. 1, storage node 30.1 comprises ten storage elements 300.1-300.10. Other storage nodes 30 could comprise a similar amount of storage elements, but this is however not essential. Storage node 30.2 could for example comprise eight storage elements 300.11-300.18. As will be explained in further detail below, the distributed object storages system 1 is operable to store and retrieve a data object comprising data, for example 64 MB of binary data and a data object identifier for addressing this data object, for example a universally unique identifier such as a globally unique identifier (GUID). Storing the data offered for storage by the application 10 in the form of a data object, also referred to as object storage, has specific advantages over other storage schemes such as conventional block based storage or conventional file based storage, such as scalability and flexibility, which are of particular importance in a distributed object storage system 1 that is directed to large scale redundant storage applications, sometimes also referred to as cloud storage.

The storage elements 300 are redundant and operate independently of one another. This means that if one particular storage element 300 fails its function can easily be taken on by another storage element 300 in the distributed storage system. However, as will be explained in more detail further below, there is no need for the storage elements 300 to work in synchronism, as is for example the case in many well-known RAID configurations, which sometimes even require disk spindle rotation to be synchronized. Furthermore, the independent and redundant operation of the storage elements 300 allows to use any suitable mix of types storage elements 300 to be used in a particular distributed object storage system 1. It is possible to use for example storage elements with differing storage capacity, storage elements of differing manufacturers, using different hardware technology such as for example conventional hard disks and solid-state storage elements, using different storage interfaces such as for example different revisions of BATA, PATA and so on. All this results in specific advantages for scalability and flexibility of the distributed object storage system 1 as it allows to add or remove storage elements 300 without imposing specific requirements to their design in correlation to other storage elements 300 already in use in that distributed object storage system 1.

Figure 4:
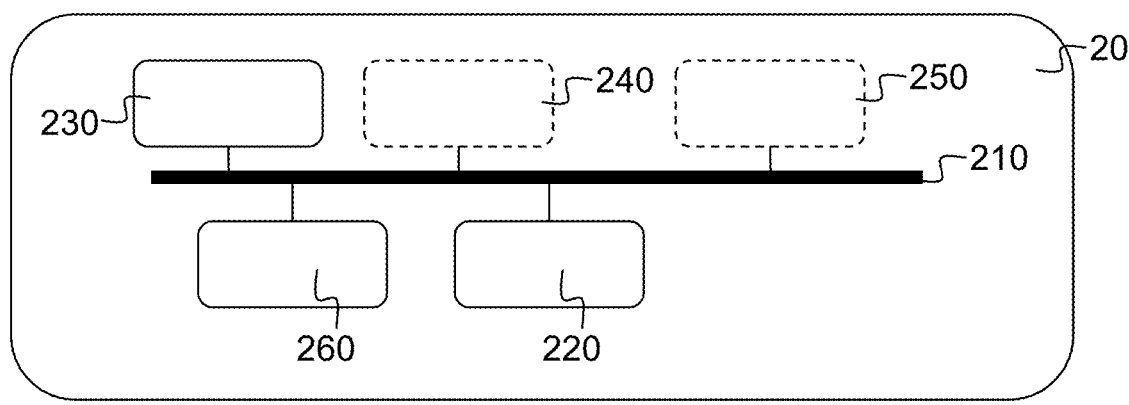
FIG. 4 schematically illustrates a controller node of the distributed object storage system of FIG. 1.

FIG. 4 shows a schematic representation of the controller nodes 20. Controller node 20 may comprise a bus 210, a processor 220, a local memory 230, one or more optional input units 240, one or more optional output units 250, and a communication interface 260. Bus 210 may include one or more conductors that permit communication among the components of controller node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to said controller node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables controller node 20 to communicate with other devices and/or systems, for example mechanisms for communicating with other storage nodes 30 or controller nodes 20 such as for example two 10 Gb Ethernet interfaces.

The controller node 20 could have an identical design as a storage node 30, or one of the storage nodes 30 of the distributed object storage system could perform both the function of a controller node 20 and a storage node 30. Further, the device on which the application 10 runs may be a controller node 30.

Figure 5:
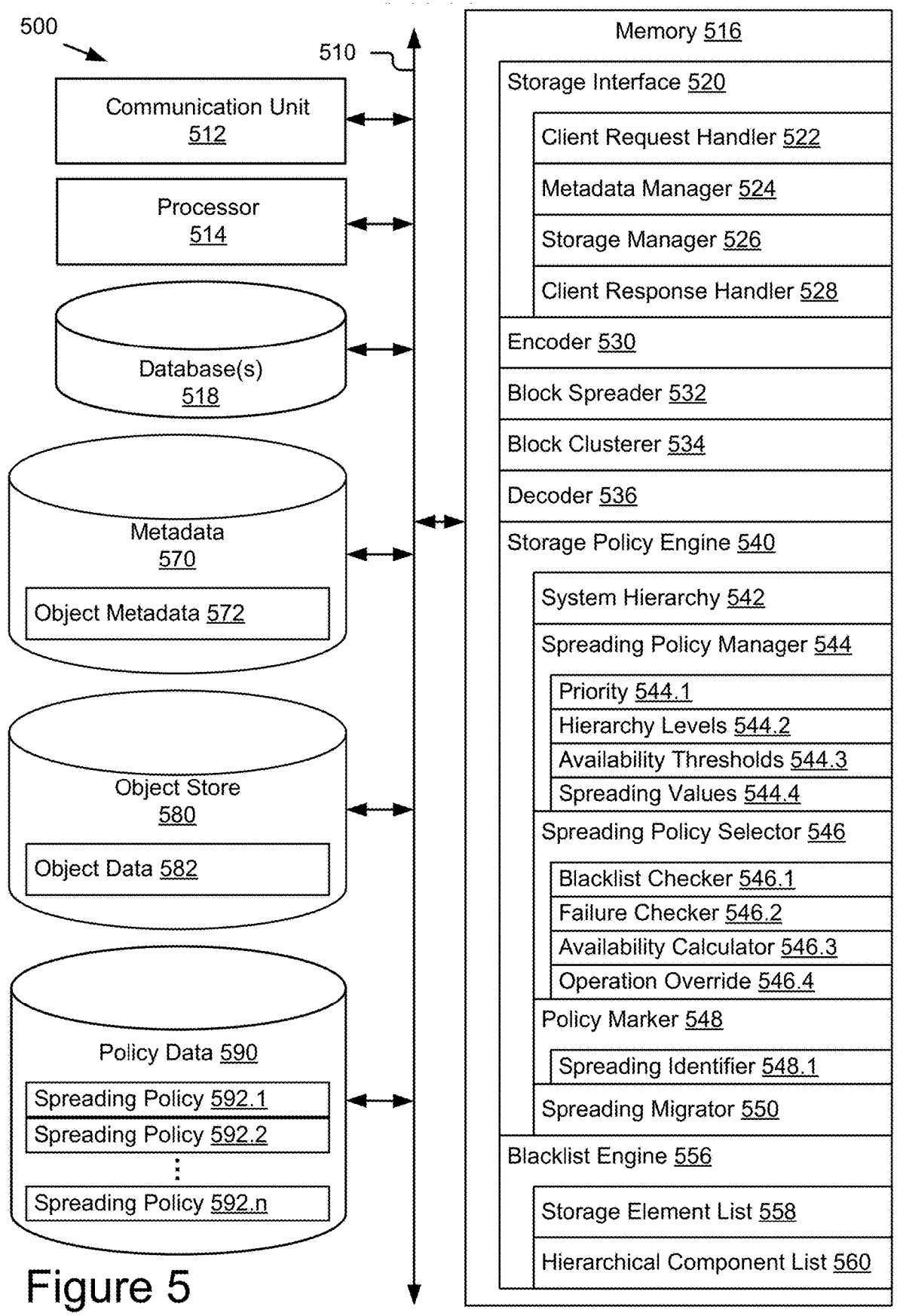
FIG. 5 schematically illustrates some elements of the controller node of FIG. 3 in more detail.

FIG. 5 schematically shows selected modules of a controller node, storage node, and/or access node with storage management functions for distributed data block storage and access. Object storage system 500 may be configured as a node with an architecture and/or hardware similar to controller node and/or storage node. Object storage system 500 may incorporate elements and configurations similar to those shown in FIGS. 1-4. For example, object storage system 500 may be configured in a controller node 20 with object storage management functions and metadata store 570 and/or object store 580 may be embodied in one or more storage nodes 30 in communication with controller node 20.

Object storage system 500 may include a bus 510 interconnecting at least one communication unit 512, at least one processor 514, and at least one memory 516. Bus 510 may include one or more conductors that permit communication among the components of object storage system 500. Communication unit 512 may include any transceiver-like mechanism that enables object storage system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such as metadata store 570, object store 580, and/or policy data 590. Databases may include one or more data structures for storing, retrieving, indexing, searching, filtering, etc. of structured and/or unstructured data elements. In some embodiments, metadata store 570 may be structured as reference data entries and/or data fields indexed by metadata key value entries related to data objects stored in object store 580. Object store 580 may include data objects comprised of object data (such as host data), some amount of metadata (stored as metadata tags), and a GUID. Metadata store 570, object store 580, and/or other databases or data structures may be maintained and managed in separate computing systems, such as storage nodes, with separate communication, processor, memory, and other computing resources and accessed by object storage system 500 through data access protocols. Metadata store 570 and object store 580 may be shared across multiple object storage systems 500.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include an encoder 530 or encoding module configured to disassemble data objects into a plurality of data blocks, such as data shards or symbols for an erasure coding configuration. Memory 516 may include a block spreader 532 or block spreading module configured to distribute the data blocks among a plurality of storage nodes or storage elements according to a spreading policy. Memory 516 may include a block clusterer or clustering module configured to retrieve a subset of distributed data blocks for reassembling the data object. Memory 516 may include a decoder 536 or decoding module configured to reassemble the data object from the retrieved data blocks and the encoding configuration used. Memory 516 may include a storage policy engine 540 configured to define one or more storage policies for use in selecting storage elements, including prioritized hierarchical spreading policies. Memory 516 may include a blacklist engine 556 configured to maintain a blacklist of storage elements that should not be the targets of storage operations and should be avoided in storage path selection. In some embodiments, encoder 530, block spreader 532, block clusterer 534, decoder 536, storage policy engine 540, and/or blacklist engine 556 may be integrated into storage interface 520 and/or managed as separate libraries or background processes (e.g. daemon) through an API or other interface.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing object metadata, such as object metadata 572 stored in metadata store 570. For example, when a new object is written to object store 580, at least one new metadata entry may be created in metadata store 570 to represent parameters describing or related to the newly created object. Metadata manager 524 may generate and maintain an object data index that enables metadata manager 524 to locate object metadata within metadata store 570. For example, metadata store 570 may be organized as a key-value store and object data index may include key values for data objects and/or operations related to those objects that are indexed with a key value that include the object identifier or GUID for each object. In some embodiments, metadata manager 524 may also manage object metadata stored in object store 580 with object data 582. Metadata manager 524 may work in conjunction with storage manager 526 to create, modify, delete, access or otherwise manage object metadata stored as object tags within object store 580.

Storage manager 526 may include interfaces, functions, and/or parameters for reading, writing, and deleting object data elements in object store 580. For example, object PUT commands may be configured to write object identifiers, object data 582, and/or object tags to object store 580. Object GET commands may be configured to read data from object store 580. Object DELETE commands may be configured to delete data from object store 580, or at least mark a data object for deletion until a future garbage collection or similar operation actually deletes the data or reallocates the physical storage location to another purpose.

Other object storage commands may be handled by storage manager 526. Object storage commands processed by storage manager 526 may include parameters for accessing special functions and/or metadata resources stored with host or client data in the data objects. Storage manager 526 may work in conjunction with metadata manager 524 for managing object metadata, including versioning information. Storage manager 526 may operate in conjunction with encoder 530, block spreader 532, block clusterer 534, and decoder 536 for encoding and decoding data objects in redundant and distributed data blocks in accordance with an erasure coding configuration or other data redundancy method. For example, storage manager 526 may use encoder 530 and block spreader 532 to write data to object store 580 and use block clusterer 534 and decoder 536 to read data from object store 580. Encoder 530, block spreader 532, block clusterer 534, and decoder 536 may in turn use storage policy engine 540 and blacklist engine 556 to select which storage elements within a given set of storage elements should be used for such write and/or read operations.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received In some embodiments, metadata store 570 may be distributed across multiple systems, such as a plurality of access systems. Metadata store 570 and/or portions thereof may be sharded data stores, wherein the data stores are partitioned into segments stored in different computing systems. Storage interface 520 may include the functions for locating and accessing relevant portions of the sharded data base.

Encoder 530, block spreader 532, block clusterer 534, and decoder 536 may comprise an erasure coding engine configured to store data objects in accordance with a reliability policy which guarantees a level of redundancy. This reliability policy may be defined and managed by storage policy engine 540 and may include encoding schemes, redundancy policy, and spreading policy. Encoder 530, block spreader 532, block clusterer 534, and decoder 536 may individually or collectively include an interface protocol or set of functions and parameters for distributing data blocks corresponding to data objects across designated sets of storage nodes and storage elements and reassembling those data objects from subsets of those sets (allowing for failures, errors, interruptions, and optimizations). For example, object storage system 500 may correctly retrieve a data object distributed among storage elements even if a number of those storage elements have failed or are otherwise inaccessible. Encoder 530, block spreader 532, block clusterer 534, and decoder 536 may implement an erasure coding configuration to achieve the requirements of a reliability policy with less overhead than full redundancy. For example, encoder 530, block spreader 532, block clusterer 534, and decoder 536 may implement Reed-Solomon codes, fountain codes, or rateless erasure codes such as online codes, low-density parity-check (LDPC) codes, raptor codes, and numerous other coding schemes that are available.

Encoder 530 may receive a data object from storage manager 526 and disassemble the data object into a predetermined number of redundant sub blocks, all associated with the same data object identifier and comprising an object set of data blocks. The predetermined number of data blocks may correspond to a predetermined multiple of a desired spreading width, based on the sum of a minimal spreading requirement and a maximum number of concurrent failures. The maximum concurrent failures tolerance may correspond to the number of storage elements that store data blocks for the data object and are allowed to fail concurrently as determined by the reliability policy. The minimum spreading requirement may correspond to the minimum number of storage elements that must be available to reassemble the data object. Encoder 530 may use an erasure coding configuration to produce the predetermined number of data blocks. In some embodiments, each data block may comprise encoded data of equal size, such as the total data object size divided by a factor equal to a predetermined multiple of the spreading requirement. Some or all data blocks may also include decoding data, such as parity data or other decoding data.

Block spreader 532 may store the predetermined number of redundant data blocks on a number of storage elements which corresponds to the desired spreading width or more. For example, block spreader 532 may store on each storage element a predetermined multiple of data blocks such that the data blocks are evenly distributed among the storage elements. In some embodiments, these storage elements may be split across module storage nodes or even multiple storage racks, storage sites, or other layers of a hierarchical storage architecture, but they may still comprise a common storage pool within object store 580.

Block spreader 532 may implement a spreading policy that may include, for example, a number of storage elements to receive the blocks, the storage pool from which those storage elements may be selected, and constraints or algorithms for how they are to be distributed (e.g. evenly across elements or nodes, randomly within an acceptable range, or using some other distribution method). In some embodiments, a hierarchical spreading policy may define additional rules for spreading data blocks, such as defining a number of sites, racks, etc. across which the data blocks should be spread. For example, the spreading policy may include a number of blocks per site, blocks per rack, blocks per node, blocks per element, etc. In some embodiments, block spreader 532 may invoke a storage path selector to select specific storage elements within a storage pool to receive one or more data blocks as further described below.

Block clusterer 534 may receive a request from storage manager 526 to retrieve a selected data object that has previously been stored through encoder 530 and block spreader 532. Based on the data object identifier, block clusterer 534 may locate a predetermined number of the redundant data blocks that were stored in the storage elements. Block clusterer 534 does not need to be able to retrieve all of the encoded data blocks in order to reassemble the data block, only a subset equal to the minimal spreading requirement. While the likelihood of outright failures corresponding to the failure tolerance is extremely low, there may be service interruptions, delays, resource bottlenecks (processing, memory, bandwidth, etc.), and other considerations that make some storage elements easier or less costly to access. Block clusterer 534 may invoke a storage path selector to select specific storage elements among the set of storage elements storing the data blocks corresponding to the selected data object. For example, a storage path selector may provide a preferred subset for retrieval or a prioritized list for enabling block clusterer 534 to choose the least costly storage elements from which to retrieve the subset of data blocks.

Decoder 536 may reassemble the selected data object from the subset of data blocks retrieved by block clusterer 534. For example, decoder 536 may apply a decoding algorithm and the decoding data from the data blocks to the encoded data in the data blocks to reassemble the selected data object from the subset of data blocks. The resulting data object may be returned to storage manager 526 and storage interface 520 to respond to a host request or other storage operation.

Storage policy engine 540 may include an interface protocol or set of functions and parameters for receiving, defining, and otherwise managing storage policies for object storage system 500 and/or a broader distributed storage system. For example, storage policy engine 540 may include functions for initiating, storing, modifying, or otherwise manipulating one or more storage policies stored in policy data store 590. In some embodiments, storage policies, such as spreading policies 592.1-592.*n*, may be stored as a set of storage policy parameters in a policy parameter table, file, object, or similar data structure. The storage policy parameters may then be used by other components in object storage system 500 to effect data management operations, such as erasure coding configurations, spreading policies, blacklist policies, and storage path selection. In some embodiments, storage policy engine 540 may include or interface with a graphical user interface for enabling system administrators to view, modify, and otherwise manage storage policy parameters.

In some embodiments, storage policy engine 540 may include a plurality of hardware and/or software modules configured to use processor 514 and memory 516 to handle or manage defined operations of storage policy engine 540. For example, storage interface 520 may include a system hierarchy model 542, spreading policy manager 544, spreading policy selector 546, policy marker 548, and spreading migrator 550. For example, system hierarchy model 542 may define storage paths available to each storage element, spreading policy manager 544 may enable the definition of a plurality of hierarchical spreading policies, spreading policy selector 546 may select the spreading policy to use for any storage operation, policy marker 548 may store policy-related identifiers in metadata to denote the policy used for a given data object or other data element, and spreading migrator 550 may enable background migration of data objects or other data elements from one spreading policy to another. Collectively, system hierarchy model 542, spreading policies 592.1-592.*n*, spreading policy selector 546, policy marker 548, and spreading migrator 550 may define a dynamic spreading policy for selecting subsets of storage elements to receive data blocks. This dynamic spreading policy may be implemented through spreading policy selector 546, spreading migrator 550, and block spreader 532, with support from blacklist engine 556 in some embodiments.

System hierarchy model 542 may include data structures, functions, and interfaces for defining a hierarchical addressing scheme and related storage paths among storage system components, such as from a controller node to the many storage elements that make up object store 580. For example, a storage pool supporting object store 580 may include a large number of storage elements grouped into storage nodes. The storage nodes may be arranged in racks or clusters using common power and networking resources, racks and clusters may be distributed across sites, from different server rooms and buildings, to geographically dispersed data centers. These layers of components, from the lowest hierarchy level of the storage elements themselves, up to one or more top-level controllers, access, or management nodes (sometimes virtualized) responsible for allocating storage requests and resulting storage operations, may define distinct failure points as well as a series or routing decisions for traversing the storage path from the top level to a target storage element. In some embodiments, a configuration data structure reflecting the storage system components, their hierarchy level, and relationship to other components may be stored in configuration data. In some embodiments, system hierarchy model 542 may be inherent in the physical and/or logical arrangement of components and reflected in a hierarchical addressing scheme regardless of whether the model is otherwise stored in a configuration map or similar modeling tool. An example system hierarchical model 542 is further shown and described with regard to FIG. 6.

Spreading policy manager 544 may include interfaces, functions, and/or parameters for identifying, selecting, and organizing storage policy parameters into defined hierarchical spreading policies. For example, spreading policy manager 544 may enable a user or system administrator to define and prioritize a set of spreading policies, then store those spreading policies in policy data 590 for use by other components, modules, or services. Spreading policy manager 544 may include an interface, parameter fields, and/or data structures for selecting various storage policy parameters that make up a spreading policy.

In some embodiments, spreading policy manager 544 may enable the selection of priority 544.1, hierarchy levels 544.2, availability thresholds 544.3, and spreading values 544.4 for each hierarchical spreading policy. Each set of these parameters may correspond to a spreading policy and spreading policy manager 544 may enable a plurality of such policies to be defined and stored. Priority 544.1 may provide an ordered priority in which spreading policy selector 546 should attempt to apply the policies, such as from a highest priority based on the highest system availability to a lowest priority, such as low availability limited to only a local or backup subsystem. Hierarchy levels 544.2 may enable the spreading policy to specify desired spreading values (such as spreading width) at multiple hierarchy levels in system hierarchy 542, such as across nodes, racks, clusters, or sites. Availability thresholds 544.3 may define a minimum number or percentage of storage elements, storage paths, or system components at various levels in system hierarchy 542 that must be available to meet the spreading policy. In some embodiments, availability thresholds 544.3 may include hierarchical availability thresholds specifying availability threshold values at each relevant level of the hierarchy levels 544.2 and corresponding to failures at various system component levels. Spreading values 544.4 may include the spreading widths or similar values for defining how many storage elements must be selected through the defined hierarchy levels and related storage paths to meet the spreading policy.

Spreading policy selector 546 may include interfaces, functions, and/or parameters for selecting which hierarchical spreading policy will be used for any given data element, such as a data object or file being stored. For example, spreading policy selector 546 may be invoked by block spreader 532 to determine the specific subset of storage elements that will receive the data blocks generated by the encoding and redundancy parameters. In some embodiments, spreading policy selector 546 may work through a plurality of spreading policies 592.1-592.*n* in priority order until a policy aligns with the available storage resources. For example, spreading policy selector 546 may first attempt to apply the highest priority policy to the selection of storage elements and, if that fails or the policy is not met, attempt the next highest priority policy, and so on. Spreading policy selector 546 may use an availability calculation for the set of storage elements targeted by the spreading policy to determine whether a given spreading policy and/or each availability threshold for each hierarchy level in the spreading policy is met.

In some embodiments, spreading policy selector 546 may use blacklist checker 546.1 and/or failure checker 546.2 to determine the availability of storage elements and/or other system components and related storage paths. Blacklist checker 546.1 may operate in conjunction with blacklist engine 556 to remove backlisted storage elements and hierarchical components from the available target storage elements and thereby calculate reduced availability without attempting to access the target storage elements. Failure checker 546.2 may rely on failed system requests and/or storage attempts to the target storage elements and/or system components to calculate reduced availability. For example, a quantity of failure messages, elapsed time without response, or similar failure events may be aggregated and quantified across the set of target storage elements to calculate reduced availability. The quantity of failures may be compared against a policy failure threshold to determine that a target storage element or system component is not available (and thereby reduce availability). In some embodiments, block spreader 532 and/or storage manager 526 may be used to initiate the system or storage requests that generate the failure events. Availability calculator 546.3 may be configured to determine from the number of blacklisted storage elements identified by blacklist checker 546.1, the quantity of failure events identified by failure checker 546.2, and/or combinations thereof that an availability percentage for a given hierarchy level does not meet the requirements of the availability thresholds 544.3 and/or spreading values 544.4 of the policy being applied. In some embodiments, availability calculator 546.3 includes a comparison of an availability value against availability thresholds 544.3 and returns a binary response of whether the policy under evaluation is met or not. If a policy is met, the policy selection of spreading policy selector 546 may be complete for the data element being stored. If the policy is not met, spreading policy selector 546 may continue to the next lower priority policy to evaluate whether it can be met.

In some embodiments, spreading policy selector 546 may include an operation override 546.4 to disable higher priority policies in response to specific user selections or operating conditions. For example, during a bulk data upload, data migration, planned system maintenance, or similar operating condition, it may be impossible or impractical to implement the highest availability policy. In such circumstances, operation override 546.4 may be configured to identify the operating condition or otherwise receive notice that one or more policies should be disabled and disable those spreading policies for a limited time. By disabling the spreading policy, spreading policy selector 546 does not waste resources on attempting to implement a spreading policy that will fail due to the operating condition or will create an unwanted resource constraint to the completion of the operation. Once the operating condition is removed, due to completion of the operation and/or manual identification, operation override 546.4 may re-enable the disabled spreading policy or policies.

Policy marker 548 may include interfaces, functions, and/or parameters for adding a metadata marker to data elements, such as data objects, files, or data blocks corresponding to one or more storage policies used to store that data element. For example, policy marker 548 may include a metadata value stored in object metadata 572 that refers to the storage policy or specific storage policy parameters used to store the data blocks corresponding to the data object. In some embodiments, policy marker 548 may store spreading identifier 548.1 to denote which spreading policy, such as spreading policies 592.1-592.*n*, was used to store the data blocks. For example, policy marker 548 may use a set of spreading identifier values corresponding to the different policies, such as a unique policy identifier, policy priority value, or other identifier. In some embodiments, policy marker 548 may selectively store spreading identifier 548.1 to identify data elements that were not stored with the highest priority spreading policy for the purpose of allowing those data elements to be migrated to the higher priority spreading policy later. For example, policy marker 548 may store a reduced spreading identifier as spreading identifier 548.1 for data elements stored with a lower priority spreading policy. In some embodiments, a reduced spreading identifier may include a flag value or other indicator value that the data element was not stored with the highest priority spreading policy. Spreading identifier 548.1 may be used by storage policy engine 540 to identify data elements stored with a lower priority spreading policy in order to provide administrative visibility to data elements stored with different spreading policies and/or allow later migration of those data elements to higher priority spreading policies. In some embodiments, policy marker 548 may store spreading identifiers for data elements with lower priority spreading policies in a separate table, file, or similar data structure until those data elements can be migrated, rather than storing them as metadata values directly associated with object metadata (such as location tables or operations logs).

Spreading migrator 550 may include interfaces, functions, and/or parameters for migrating data elements stored using a lower priority spreading policy to a higher priority spreading policy using an expanded subset of storage elements required for the higher priority spreading policy. For example, spreading migrator 550 may initiate a background migration operation that searches object metadata 572, identifies data objects that include a spreading identifier value that indicates a lower priority spreading policy (such as the reduced spreading identifier), reads the data object, and rewrites the data object to store it at a higher priority spreading policy. In some embodiments, spreading migrator 550 may operate in conjunction with operation override 546.4 and be initiated responsive to a previously disabled, higher priority spreading policy being enabled. For example, after operation override 546.4 has identified that the operating condition that triggered the high priority spreading policy to be disabled has ended, operation override 546.4 may notify spreading migrator 550 to initiate the migration process as a foreground or background process. In some embodiments, spreading migrator 550 may include a background process that is initiated by an administrator, on an automated maintenance schedule, and/or responsive to resource availability to identify data objects stored with lower priority spreading policies and migrate them to the preferred, higher priority spreading policies. In some embodiments, spreading migrator 550 may attempt to migrate data objects stored with lower priority spreading policies as a background process regardless of whether the higher priority spreading policy is disabled for foreground or new data storage requests. Spreading migrator 550 may also initiate delete operations for the lower priority version of a data element once it has been successfully migrated to a higher priority spreading policy.

Blacklist engine 556 may include an interface protocol or set of functions and parameters for generating, modifying, and managing a blacklist of storage elements based on events that prevent or delay storage of data to or retrieval of data from those data elements. For example, blacklist engine 556 may identify failed storage request events, such as events based on issuing a storage request to a target storage element or intervening system component that generate an error, no response, or timeout within a predetermined period, and use the identified events to determine which elements should be added to or remain on a blacklist. In some embodiments, blacklist engine 556 may also include a process for removing elements from the blacklist. Blacklisted storage elements or other system components may be considered failed, offline, or otherwise unavailable and the blacklist status may be used by block spreader 532 and/or block clusterer 534 to determine or influence the storage elements and related storage paths used for any given storage request. In some embodiments, blacklist engine 556 may provide blacklist information to spreading policy selector 546 and blacklist checker 546.1 for determining which spreading policy to use for a storage request.

In some embodiments, blacklist engine 556 may manage blacklist status or blacklist identifiers for a storage element list 558 and/or a hierarchical system component list 560. For example, blacklist engine 556 may initiate one or more data structures for holding storage element addresses or identifiers with blacklist status, such as a table or array of component identifiers and blacklist status values. In some embodiments, blacklist engine 556 may store a blacklist status value in an existing data structure for managing component or storage element status parameters or other information. Blacklist engine 556 may include functions for initiating blacklist identifiers, adding new storage elements or components to storage element list 558 and/or a hierarchical system component list 560, and removing storage elements or components from storage element list 558 and/or a hierarchical system component list 560. In some embodiments, blacklist identifiers may correspond to hierarchical addresses for blacklisted storage elements and/or system component identifiers for blacklisted hierarchical system components.

Memory 516 may include additional logic and other resources (not shown) for processing object data requests, such as modules for generating, queuing, and otherwise managing object data requests. Processing of an object data request by storage interface 520 may include any number of intermediate steps that yield at least one data request to the distributed storage system.

Figure 6:
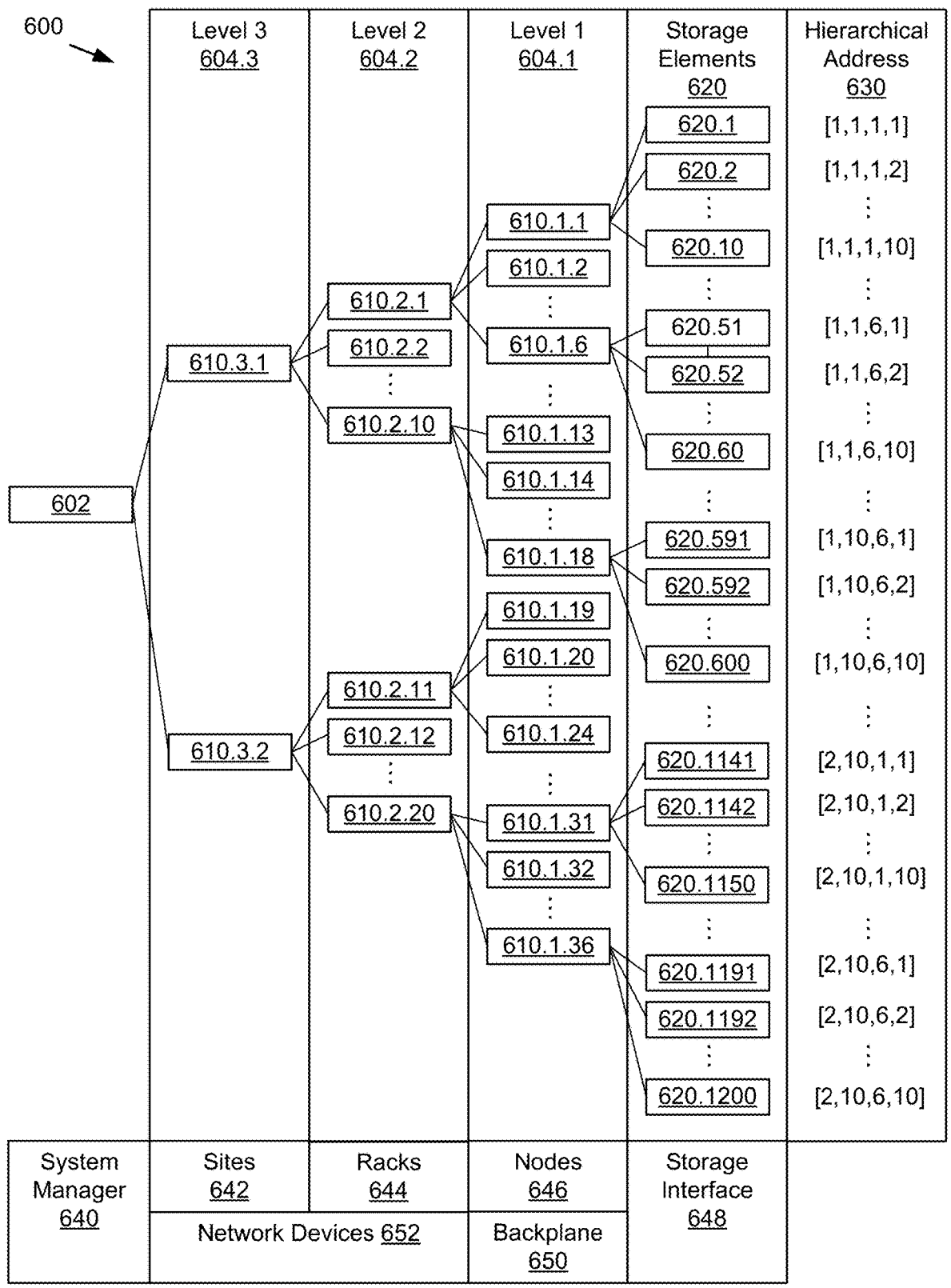
FIG. 6 schematically illustrates the different levels of the hierarchic tree structure provided by a hierarchic distributed object storage system.

FIG. 6 shows an example hierarchical model of a distributed storage system 600, similar to distributed storage system 1 and its components, as described in FIGS. 1-5. The various levels 604 of the hierarchical configuration of the components of distributed storage system 600 form a tree structure and the path from controller node 602 to each storage element 620 forms a unique storage path associated with that storage element.

At the first hierarchy level 604.1, storage elements 620 are grouped into first components 610.1, such as storage nodes 646. In the example shown, each storage node component 610.1 may include ten storage elements 620, such as drives, and the 1200 storage elements correspond to 120 distinct storage nodes. In some embodiments, storage elements 620 may be communicatively connected to storage nodes 646 over their respective storage interfaces 648.

At the second hierarchy level 604.2, storage elements 620 may be further grouped into second components 610.2, such as storage racks 644. In the example shown, each storage rack component 610.2 may include six storage node components 610.1 and the 120 storage nodes may be grouped into 20 distinct storage racks. In some embodiments, storage nodes 646 may be connected to storage racks 644 by a backplane 650 including one or more network connections from a rack switch or similar component to each storage node.

At the third hierarchy level 604.3, storage elements 620 may be further grouped into third components 610.3, such as sites 642. In the example shown, each site component 610.3, which may represent a site network configuration and related equipment, may include ten storage rack components 610.2 and the 20 storage racks may be grouped into two distinct sites. In some embodiments, storage racks 644 may be connected into sites 642 by network devices 652, such as routers, network switches, and network management devices.

A system manager 640 may be hosted in controller 602 for overseeing storage requests to distributed storage system 600. In some embodiments, controller 602 may host elements similar to those shown in memory 516 of FIG. 5 for managing storage requests and encoding them to and decoding them from an object data store comprised of distributed storage elements 620.

In some embodiments, distributed storage system 600 may use hierarchical addresses 630 for identifying individual storage elements. Each storage element 620 may comprise a corresponding unique storage element identifier that is a hierarchical address. For example, the hierarchical address of storage element 620.1 is [1,1,1,1] and the hierarchical address of storage element 620.1200 is [2,10,6,10].

In some embodiments, each hierarchical address may be comprised of several hierarchical system component identifiers that identify the corresponding hierarchical configuration for each storage element 620. These component identifiers may each occupy a position that is a hierarchy level identifier. For example, each hierarchical address may be an array of four numerals. The left most or first numeral in the array may be a hierarchy level identifier and contain a component identifier for components 610.3 in hierarchy level 3. The next numeral in the array moving right may be a hierarchy level identifier and contain a component identifier for components 610.2 in hierarchy level 2. The next numeral on the array moving right again may be a hierarchy level identifier and contain a component identifier for components 610.1 in hierarchy level one. The right most numeral is a component identifier for storage elements 620 and may be considered not to be a hierarchy level identifier or to identify hierarchy level 0, the storage elements themselves.

Hierarchical addresses 630 may identify a hierarchical storage path by reference to the specific hierarchical system components at each hierarchy level that data blocks will pass through between controller 602 and each storage element 620. The example shown includes three hierarchy levels resulting in a four-number array of hierarchy level identifiers to describe the address and storage path. Other hierarchical storage models may include more or fewer hierarchy levels and the number of identifiers in the address may generally equal the number of hierarchy levels plus one for the storage element identifiers themselves. For example, some configurations may have only two hierarchy levels and others may have four or more. Example hierarchy level identifiers may include a storage element identifier, a storage node identifier, a storage rack identifier, a storage cluster identifier, a storage site identifier, and a storage system identifier, though other hierarchy level identifiers and corresponding component identifiers are possible.

In some embodiments, each hierarchy level may be used to group the components below any given system component (other than storage elements). For example, each storage node of storage nodes 646 may correspond to a node group that includes the storage elements in that storage node (and representing the next lower level of the hierarchy). Each storage rack of storage racks 644 may correspond to a rack group that includes the storage nodes in that storage rack. Each network site of network sites 642 may correspond to a site group that includes the storage racks in that network site. At the system manager level, all system components below and/or the aggregate storage elements at the lowest level of the hierarchy may be referred to as the storage pool for the object store or distributed storage system managed by system manager 640.

Figure 7:
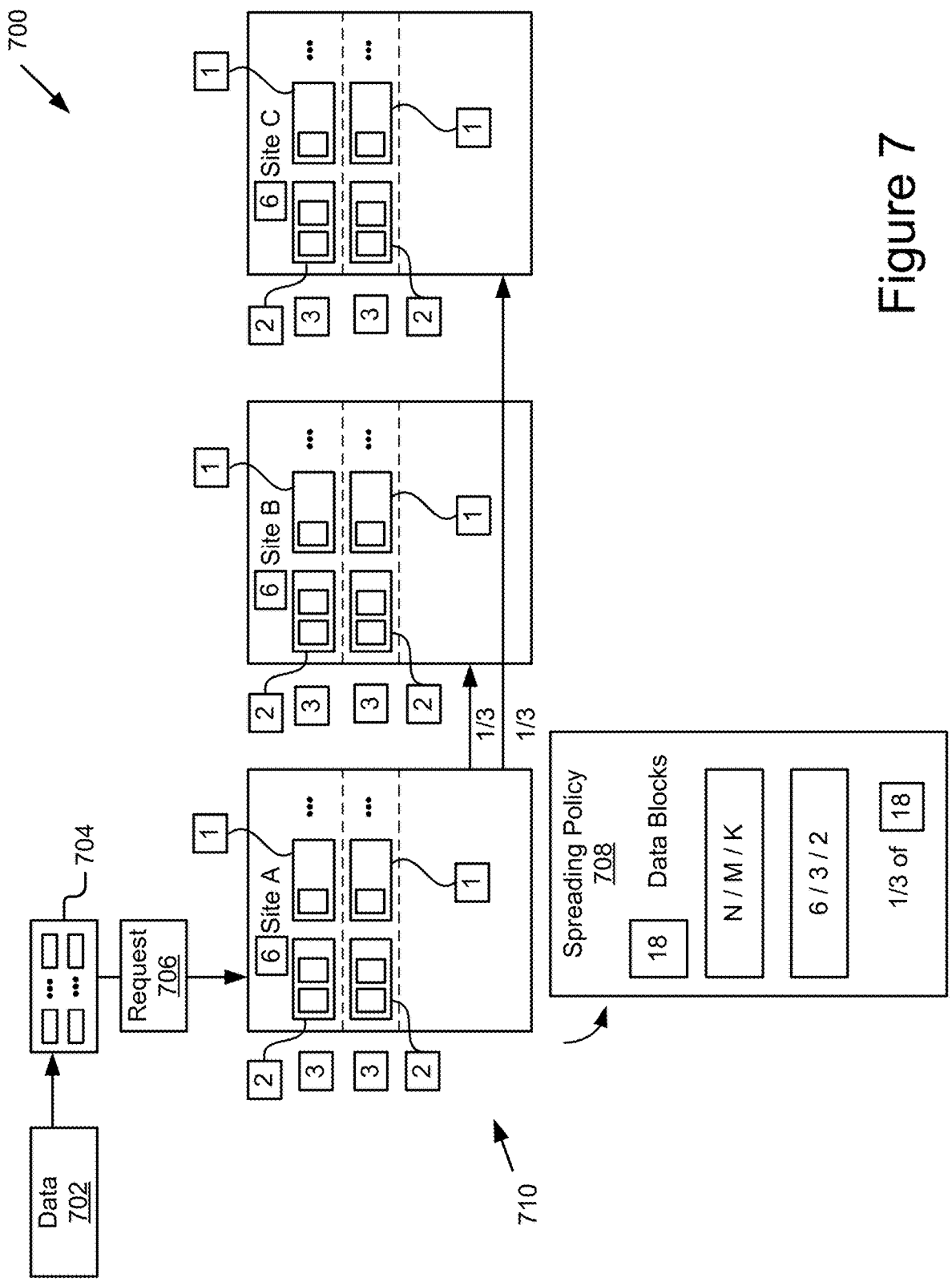
FIG. 7 illustrates a first example of a hierarchical spreading policy.
Figure 8:
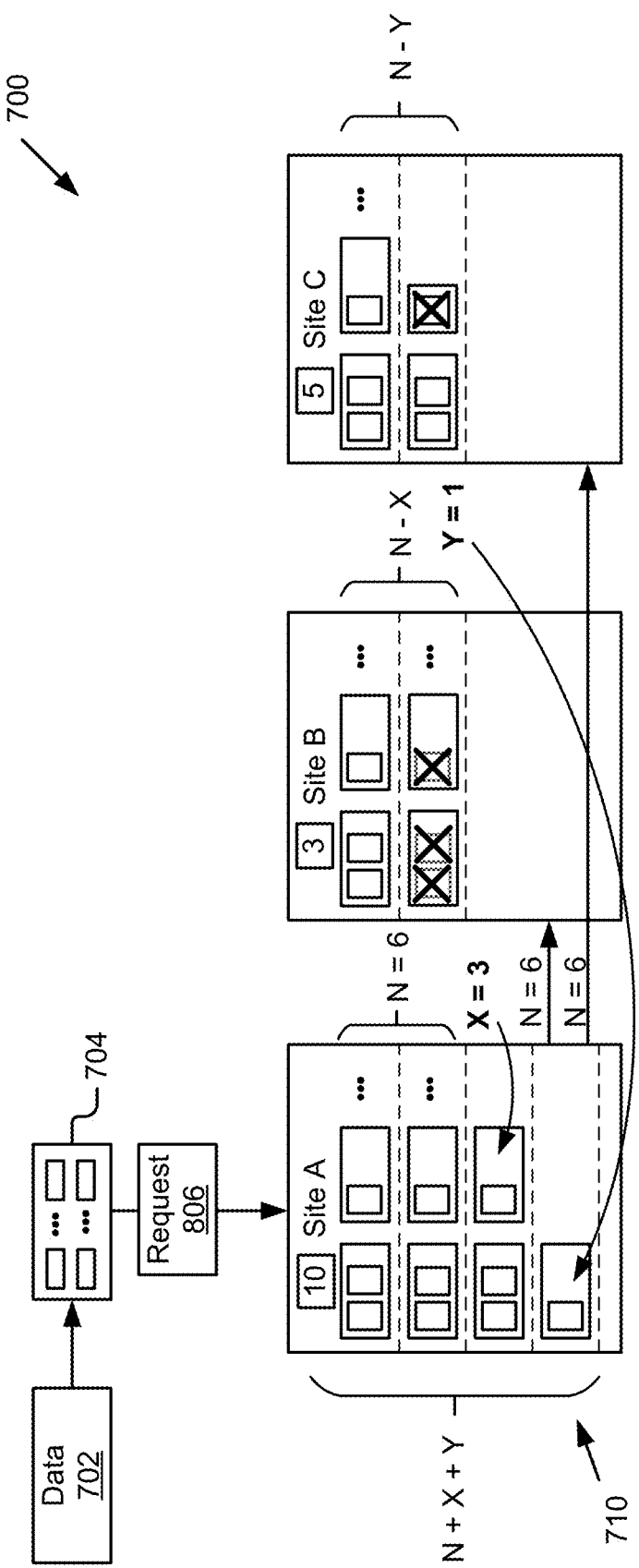
FIG. 8 illustrates a second example of a hierarchical spreading policy.
Figure 9:
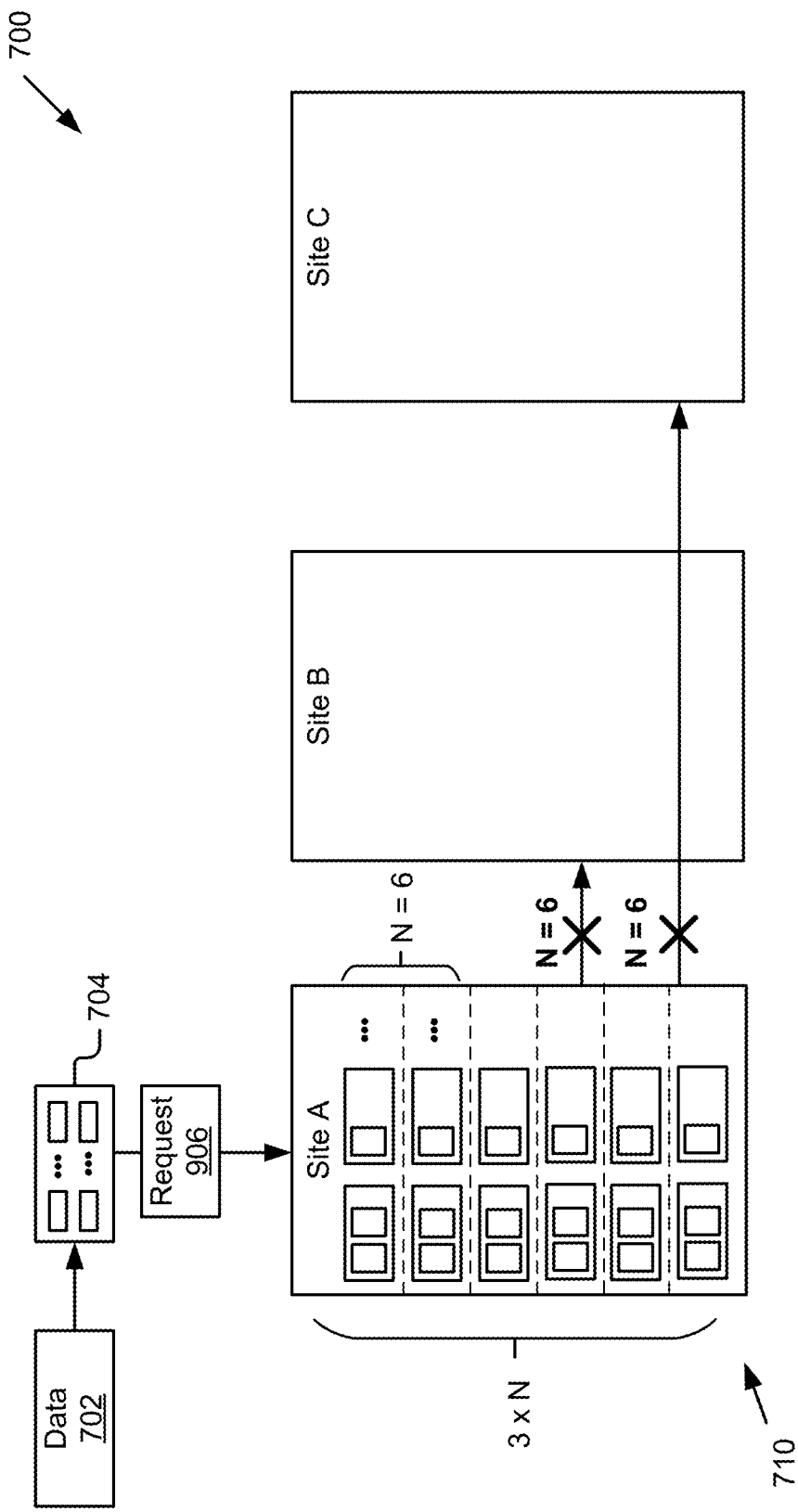
FIG. 9 illustrates a third example of a hierarchical spreading policy.

FIGS. 7-9 illustrate different example hierarchical spreading policies. In the context of large-scale distributed object storage systems, the use of a spreading policy achieves a specific level of redundancy. However, transient states of the distributed object storage system, for example after new data is written to the DSS, and until the final desired spreading state is reached, may present a problem which may be addressed by embodiments described herein. If such a problem is not addressed, a reduced level of redundancy may result and increased latency and increased use of resources may result.

FIG. 7 illustrates a use of a 'hierarchy level identifier' to enable a spreading policy able to guarantee a desired spreading at different levels of the distributed object storage system, such as for example at the level of the site, the rack, the storage nodes, etc. As described, DSS 700 spreads the data blocks 704 of a data element 702 among a selection of storage elements according to a specific spreading policy 708 embodied in request 706. In the example shown, 18 data blocks 704 are distributed to storage pool 710 for DSS 700. According to some embodiments, spreading policy 708 may be defined by means of a desired spreading width for each hierarchy level. For example, the spreading policy could be expressed as a minimum of N-blocks of data per site, M-blocks of data per rack, K-blocks of data per storage node.

FIG. 7 illustrates such an example and illustrates a hierarchical spreading policy "N/M/K" of "6/3/2" for a distributed object storage system which, for example, generates 18 data blocks with a sufficient level of redundancy for a request for storing data. As shown, the spreading policy ensures that the blocks (i.e., subblocks) are spread such that a maximum of 6 blocks are stored per site, 3 blocks per rack, and 2 blocks per storage node. These numbers could also be expressed in other terms, such as, for example, as a relative share of the total number of blocks. In this example, the 6 blocks per site corresponds for example to ⅓ of the 18 data blocks. It will be appreciated that other examples of redundant spreading of data is possible, in which any suitable number of (encoded) data blocks may be generated and spread according to a spreading policy.

According to some embodiments, instead of a static spreading policy, a dynamic spreading policy is described with a plurality of priority levels. In this way, the distributed object storage system will be able to more efficiently and reliably cope with states in which the desired final spreading policy is either not yet reached or is no longer attainable. An example of such conditions may include conditions during initial storage of the data blocks, during a repair operation after a failure, etc.

According to some embodiments, a dynamic spreading policy may be implemented based on a plurality of spreading policies, with each having a different priority level based on various distributions of accessibility of the redundant storage elements. According to such an embodiment there could for example be provided various spreading policies.

One group of policies may be based on 'best efforts' to provide the most broadly spread redundant storage elements, based on the highest possible availability of the target storage pool. Such a best effort policy may utilize synchronous fallback priority levels. The levels may include:
1) Priority Level 1: including a 'Global' spreading policy that includes distribution across data centers (i.e., sites), racks, and groups of storage nodes, an example of which may include a [6/3/2] distribution;
2) Priority Level 2: including a "Local' spreading policy that includes distribution across rack, and groups of storage nodes, an example of which may include a [∞,3/2] distribution;
   where X=number of failed blocks at site x; Y=number of failed blocks at site y=>at this site locally: store 6(N from global policy)+X+Y data blocks;
3) Priority Level 3: including a "Rack-Local' spreading policy that includes distribution across groups of storage nodes, an example of which may include a [∞,∞/2] distribution.

Another group of policies may be based on 'forced efforts' to provide forced spreading of distribution across the redundant storage elements by skipping higher priority levels during initial storage. Such a forced effort policy may utilize forced fallback priority levels. The levels may include:
1) Priority Level 1: including a 'Global' spreading policy that includes distribution across data centers (i.e., sites), racks, and groups of storage nodes, an example of which may include a [6/3/2] distribution, which may be skipped during initial storage;
2) Priority Level 2: including a "Local' spreading policy that includes distribution across rack, and groups of storage nodes, an example of which may include a [∞,3/2] distribution;
   where all 18 (3×N) blocks are stored on the local site, don't try to store blocks at remote sites;
3) Priority Level 3: including a "Rack-Local' spreading policy that includes distribution across groups of storage nodes, an example of which may include a [∞,∞/2] distribution.

To continue the example shown in FIG. 7, if the priority level 1 spreading policy cannot be met, DSS 700 may automatically fall back to the next highest priority level. For example, if the availability at one or more hierarchy levels falls below the availability threshold needed for priority level 1, DSS 700 may attempt to store the data blocks at priority level 2. Such downgraded availability may be, for example, due to network problems, failure events, etc. Request 706 for storing 18 data blocks according to the global spreading policy [6/3/2] may fail because, for example as shown in FIG. 8, 3 data blocks cannot currently be stored in Site B (i.e., a second data center) and 1 data block that cannot be stored in Site C (i.e., a third data center), then the spreading policy will attempt to achieve a lower priority level. The example shown in FIG. 8 illustrates an attempt at a best effort local spreading policy of priority level 2, in which the failed/unavailable blocks at sites 2 and 3 are stored in accordance with the local level 2 spreading policy at site A responsive to request 806.

As shown in FIG. 8, DSS 700 attempts to store up to 6 data blocks at each site. However, site B has a failed rack that returns 3 data blocks (X=3) for storage at site A. Site C has a failed node that returns 1 data block (Y=1) to site A. Under the priority level 2 best efforts policy, DSS 700 stores as many blocks as it can on sites B and C before allocating them to additional racks and nodes at site A. Storing on all sites may be retried several times until a threshold of failed attempts has been reached before allocating failed blocks onto additional storage elements at site A.

According to a forced effort example, as illustrated in FIG. 9, a request 906 at priority level 3 stores all 18 data blocks in Site A, e.g., in accordance to a spreading policy with the local priority level. In some embodiments, as described above, data element 702 and/or data blocks 704 may be marked for subsequent redistribution or migration, for example by spreading migrator 550 in FIG. 5. In this way, for example, during a subsequent redistribution or repair process, DSS 700 will attempt to achieve a higher priority spreading policy, preferably the highest priority spreading policy by redistributing these marked data blocks. Such a redistribution process may only be performed for these marked data blocks and may be advantageous as it only involves moving the marked data blocks to another location.

It is clear that different embodiments are possible for the trigger to make use of a lower priority level spreading rule when processing a request for storage of data in the DSS. Such triggers could be for example based on suitable thresholds for:
1) A predetermined number of failed attempts to store the data blocks according to the higher priority level spreading policy;
2) A predetermined time period in which attempts to store the data blocks according to the higher priority level spreading policy did not succeed.

Alternative embodiments to the one described above are possible. More specifically the hierarchy levels could be different and/or linked to different hierarchic entities as described above. Examples of hierarchic entity types may be, for example, a storage site, a storage rack, a storage cluster, a storage node, a storage element, a storage system, etc. and/or networking components that define distinct network storage paths among storage components, such as a network switch, a network, a subnetwork, etc. Advantages or benefits of the embodiments disclosed herein include increased durability, decreased latency when processing a request, more efficient repair/redistribution processing the context of a large-scale distributed object storage system.

Figure 10:
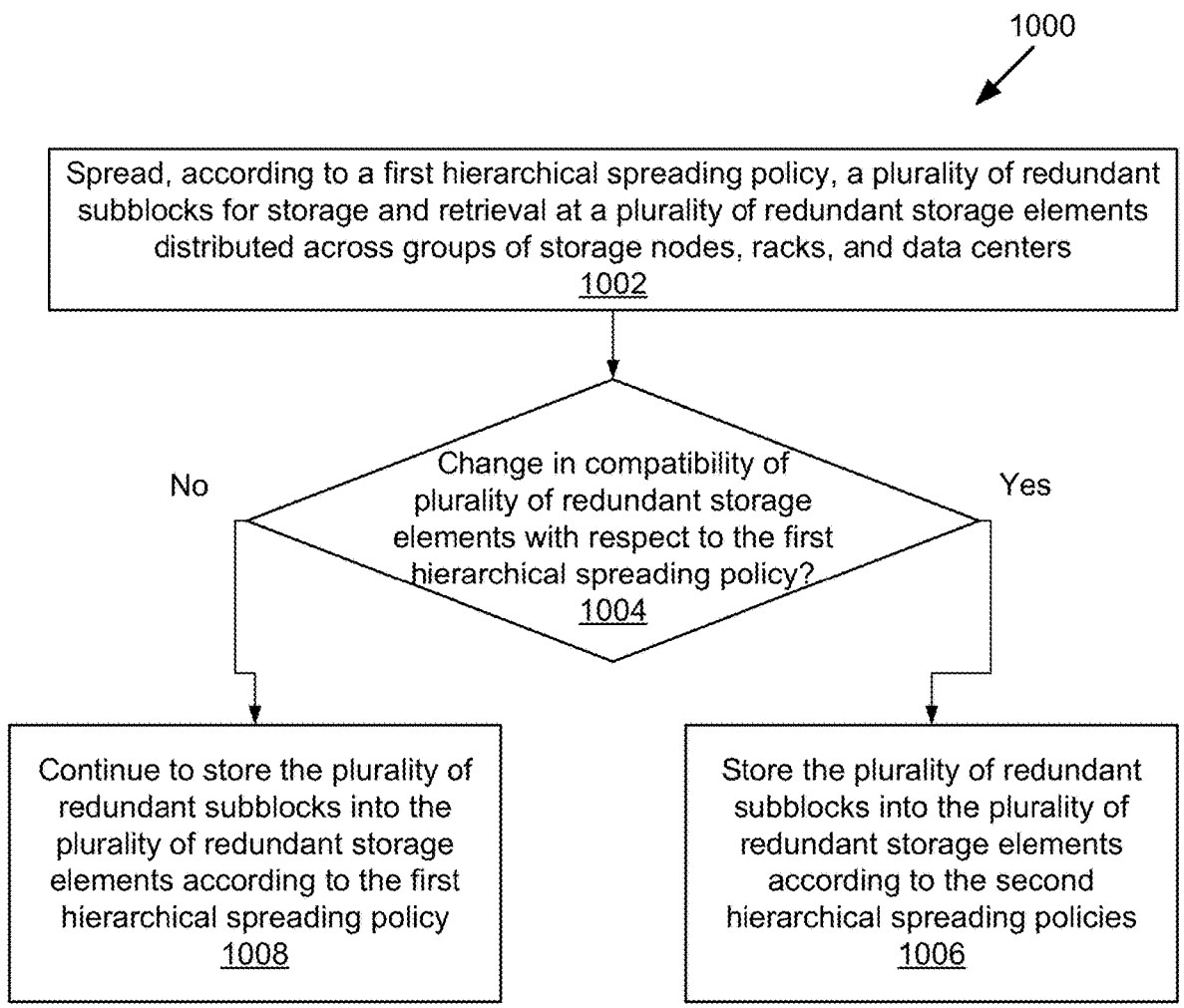
FIG. 10 is a flowchart of an example method of transitioning between hierarchical spreading policies.

FIG. 10 illustrates a flowchart for changing a hierarchical spreading policy. Method 1000 may be performed by a distributed object storage system, such as the distributed storage systems described with regard to FIGS. 1-9, that includes a plurality of redundant storage elements distributed across groups of storage nodes, racks, and data centers. The plurality of redundant storage elements may be configured to store and retrieve a data object, wherein the data object includes a data object identifier and object data with the object data partitioned into a plurality of redundant data blocks or subblocks each including the data object identifier.

The distributed object storage system may further include a spreading module or block spreader operable to store the plurality of redundant subblocks into the plurality of redundant storage elements according to a first hierarchical spreading policy. The first and a second hierarchical spreading policies may be based on all or less than all of a first distribution of ones of the plurality of subblocks across a group of the plurality of storage nodes, a second distribution of ones of the plurality of subblocks across a plurality of racks, and a third distribution of ones of the plurality of subblocks across a plurality of data centers. When access to the plurality of redundant storage elements changes with respect to the first hierarchical spreading policy, selecting a second hierarchical spreading policy based on a changed access to the plurality of redundant storage elements.

In a block 1002, the method spreads, according to a first hierarchical spreading policy, a plurality of redundant subblocks for storage and retrieval at a plurality of redundant storage elements distributed across groups of storage nodes, racks, and data centers. The plurality of redundant storage elements is configured to store and retrieve a data object, wherein the data object includes a data object identifier and object data with the object data partitioned into the plurality of redundant subblocks each including the data object identifier. The first hierarchical spreading policy is based on all or less than all of a first distribution of ones of the plurality of subblocks across a group of the plurality of storage nodes, a second distribution of ones of the plurality of subblocks across a plurality of racks, and a third distribution of ones of the plurality of subblocks across a plurality of data centers.

In a block 1004, the method selects a second hierarchical spreading policy based on a changed access to the plurality of redundant storage elements when access to the plurality of redundant storage elements changes with respect to the first hierarchical spreading policy.

In a block 1006, the method stores the plurality of redundant subblocks into the plurality of redundant storage elements according to the second hierarchical spreading policy when access to the plurality of redundant storage elements changes with respect to the first hierarchical spreading policy.

In a block 1008, the method continues to store the plurality of redundant subblocks into the plurality of redundant storage elements according to the first hierarchical spreading policy when access to the plurality of redundant storage elements does not change with respect to the first hierarchical spreading policy.

Figure 11:
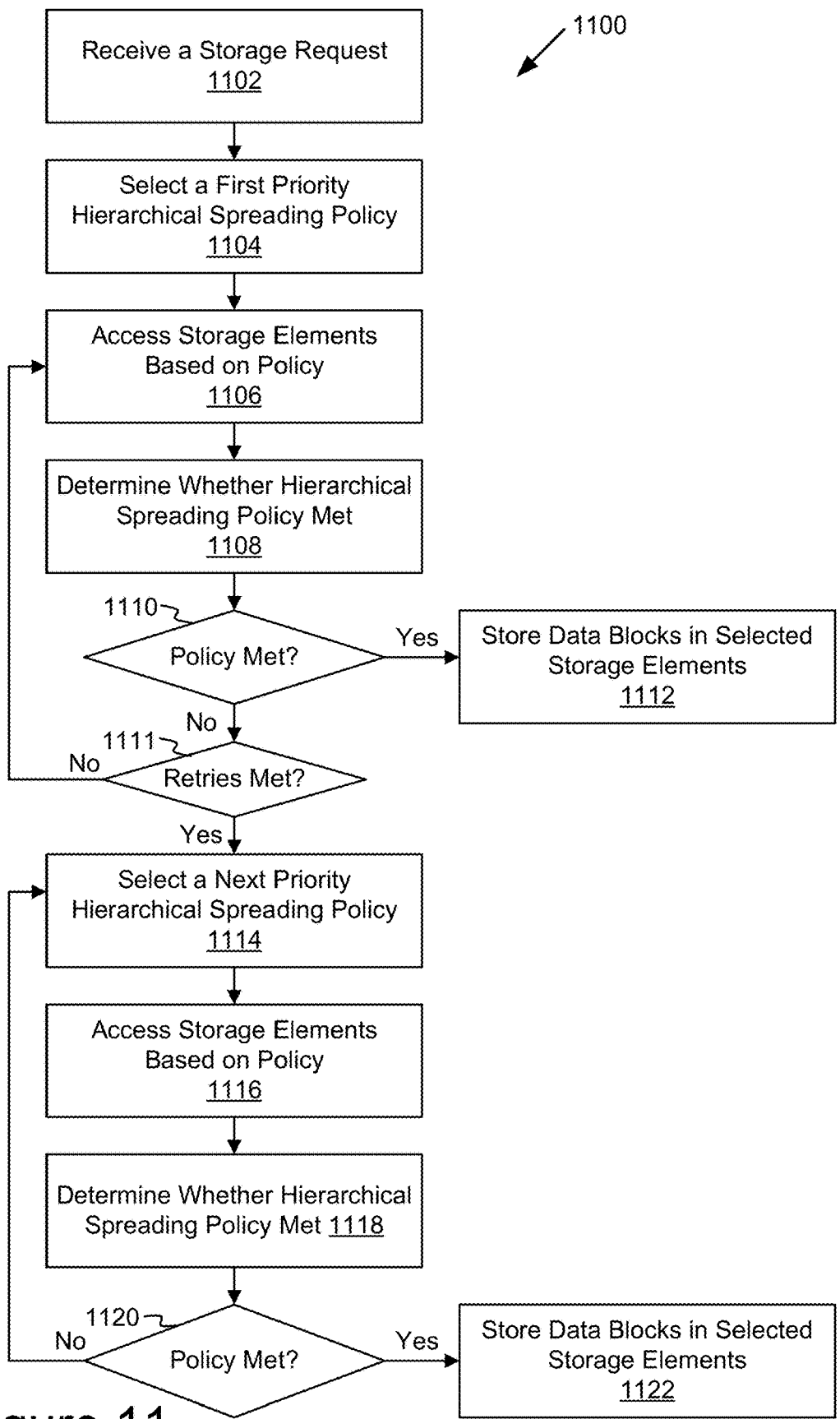
FIG. 11 is a flowchart of an example method of dynamically selecting spreading policies.

As shown in FIG. 11, the object storage system 500 may be operated according to an example method for using a hierarchical spreading policy to process storage requests, i.e. according to method 1100 illustrated by blocks 1102-1122 in FIG. 11.

At block 1102, a storage request may be received for a data element. For example, a storage interface may receive a write request for a data object.

At block 1104, a hierarchical spreading policy with a first priority may be selected. For example, a storage policy engine operating in conjunction with a block spreader may select the highest priority hierarchical storage policy in a configuration that includes a plurality of hierarchical storage policies.

At block 1106, storage elements in a storage pool may be accessed for storing data blocks corresponding to the data element. For example, the block spreader may receive a predefined number of redundant data blocks from an encoder and may attempt to store the redundant data blocks in accordance with the first priority hierarchical storage policy.

At block 1108, whether the hierarchical spreading policy can be met by the available storage elements in the storage pool may be determined. For example, the storage policy engine may identify and evaluate the available storage elements to determine whether they meet the availability thresholds at each hierarchy level in the hierarchical spreading policy. At block 1110, if the hierarchical storage policy is met, method 1100 may proceed to block 1112. If the hierarchical storage policy is not met, method 1100 may proceed to block 1114, optionally through block 1111. In some embodiments, at block 1111, a retry threshold may be evaluated before method 1100 proceeds to block 1114. If the retry threshold is met, method 1100 may proceed to block 1114 and, if not, may return to block 1106 to retry use of the first priority hierarchical spreading policy.

At block 1112, the data blocks are stored in the selected storage elements in accordance with the first priority hierarchical spreading policy. For example, the block spreader may successfully store each redundant subblock from the encoder to a target storage element selected in accordance with the hierarchical spreading policy.

At block 1114, a hierarchical spreading policy with a next priority may be selected. For example, the storage policy engine may select the next highest priority hierarchical storage policy from among the plurality of hierarchical storage policies defined for the DSS, At block 1116, storage elements in the storage pool may be accessed for storing data blocks corresponding to the data element. For example, the block spreader may again attempt to store the redundant data blocks in accordance with the next selected hierarchical storage policy.

At block 1118, whether the selected hierarchical spreading policy can be met by the available storage elements in the storage pool may be determined. For example, the storage policy engine may identify and evaluate the available storage elements to determine whether they meet the availability thresholds at each hierarchy level in the next selected hierarchical spreading policy. At block 1120, if the hierarchical storage policy is met, method 1100 may proceed to block 1122. If the hierarchical storage policy is not met, method 1100 may return to block 1114 to select a next priority hierarchical spreading policy (until a spreading policy is met). When the lowest priority hierarchical spreading policy cannot be met, the request may fail and method 1100 may end without storing data blocks in selected storage elements at block 1112 or 1122.

At block 1122, the data blocks are stored in the selected storage elements in accordance with the selected hierarchical spreading policy. For example, the block spreader may successfully store each redundant subblock from the encoder to a target storage element selected in accordance with the selected hierarchical spreading policy.

Figure 12:
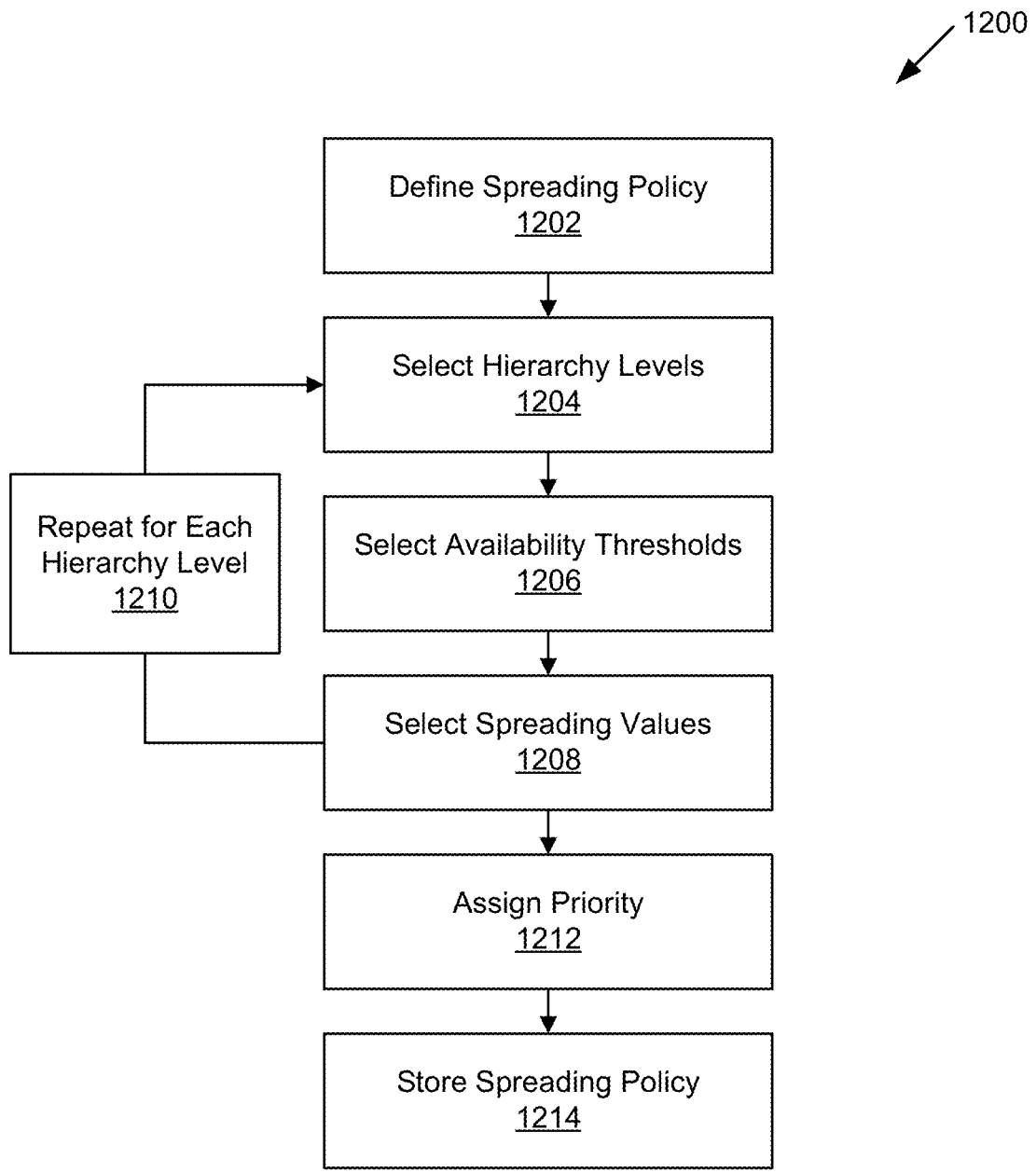
FIG. 12 is a flowchart of an example method of creating hierarchical spreading policies.

As shown in FIG. 12, the object storage system 500 may be operated according to an example method of creating hierarchical spreading policies for populating a prioritized set of spreading policies, i.e. according to method 1200 illustrated by blocks 1202-1212 in FIG. 12.

At block 1202, a spreading policy may be defined. For example, a spreading policy manager may enable users or system resources to configure a plurality of spreading policies, as well as organize and select among those policies for determining the set of hierarchical spreading policies available to the DSS.

At block 1204, hierarchy levels may be selected for the defined spreading policy. For example, the spreading policy manager may select from the hierarchy levels defined in the system hierarchy to define the spreading parameters for that hierarchy level. This may be repeated for each hierarchy level.

At block 1206, an availability threshold may be selected for the selected hierarchy level. For example, the spreading policy manager may set an availability percentage or similar availability threshold value that must be met for spreading data blocks across the selected hierarchy level. This may be repeated for each hierarchy level.

At block 1208, a spreading value may be selected for the selected hierarchy level. For example, the spreading policy manager may set a spreading width value or similar spreading value that must be met for spreading data blocks across the selected hierarchy value. In some embodiments, the availability threshold and/or spreading value may be derived from one another based on the system configuration and maximum number of system components available at a selected hierarchy level and/or storage path through the system hierarchy. This may be repeated for each hierarchy level. At block 1210, method 1200 may return to block 1204 to select additional hierarchy levels and spreading policy parameter values.

At block 1212, a priority may be assigned to the defined spreading policy. For example, the spreading policy manager may assign a priority to the defined spreading policy relative to other spreading policies for the DSS. Priority assignments may define an order in which the set of hierarchical spreading policies may be applied by the storage policy engine, including a highest priority spreading policy, generally based on highest availability of storage elements in the storage pool, to a lowest priority spreading policy, generally based on local storage and the most limited acceptable availability of storage elements in the storage pool to complete a storage request.

At block 1214, the defined spreading policy is stored for use during storage requests. For example, the spreading policy manager may store the defined spreading policy, including selected spreading parameters, to a policy data store in a data structure configured for multiple hierarchical spreading policies.

Figure 13:
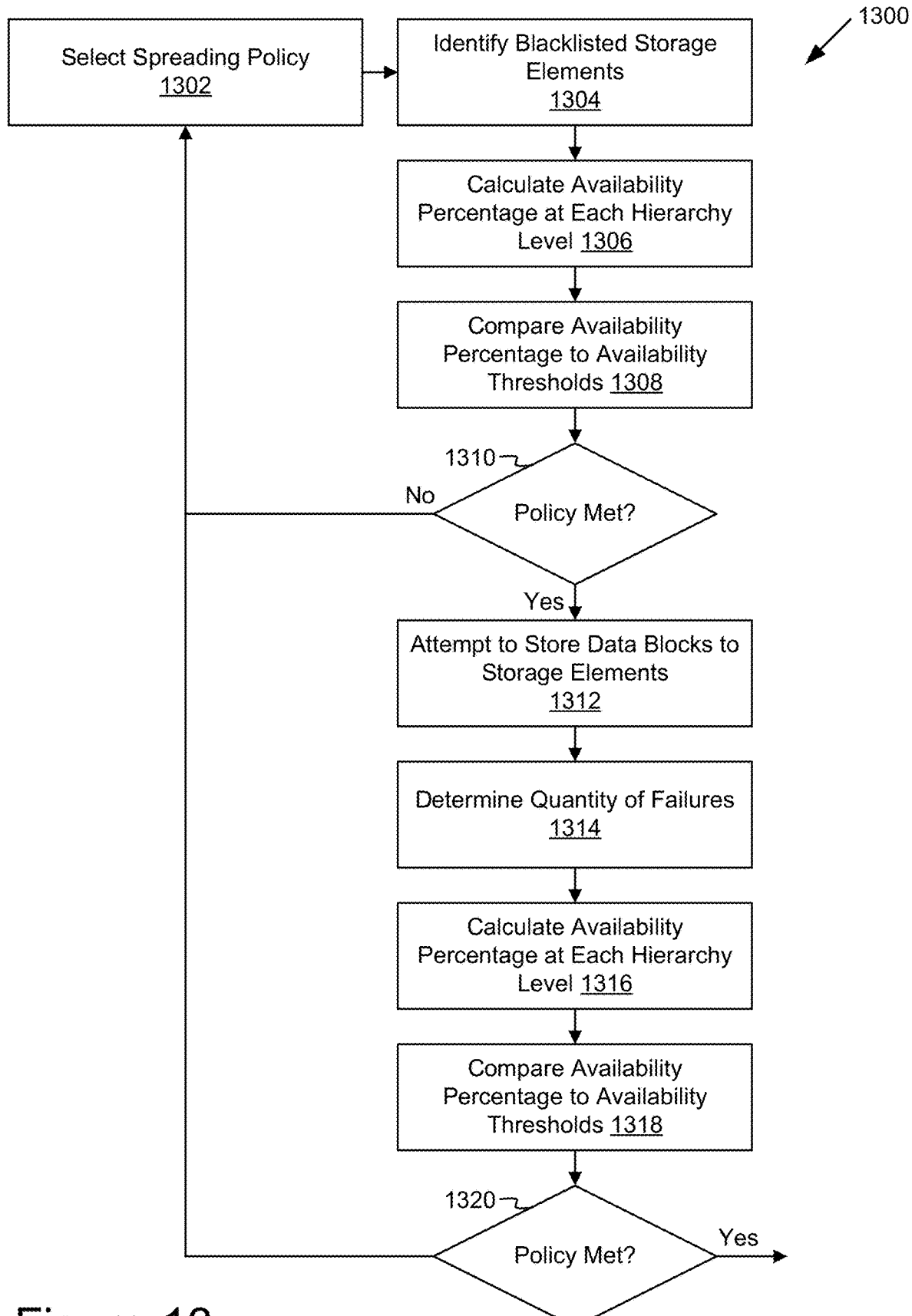
FIG. 13 is a flowchart of an example method of determining whether a hierarchical spreading policy is met.

As shown in FIG. 13, the object storage system 500 may be operated according to an example method of determining whether a hierarchical spreading policy is met, i.e. according to method 1300 illustrated by blocks 1302-1320 in FIG. 13.

At block 1302, a spreading policy may be selected. For example, a spreading policy selector may select a spreading policy from the set of hierarchical spreading policies available to the DSS based on the current priority level being evaluated by the spreading policy selector.

At block 1304, blacklisted storage elements may be identified. For example, a blacklist checker may access one or more blacklists from a blacklist engine to identify storage elements and/or storage system components that are not available in the storage pool for the current storage request.

At block 1306, an availability percentage or ratio may be calculated for each hierarchy level in the selected spreading policy. For example, an availability calculator may determine the total number of storage elements or system components at a hierarchy level and/or available through the relevant storage paths and divide the total value into an availability value for the available storage elements, storage system components, and/or storage paths to determine a ratio, which may in turn be expressed as a percentage.

At block 1308, the availability percentage or ratio may be compared to an availability threshold for each hierarchy level in the selected spreading policy. For example, the availability calculator may compare the calculated availability percentages or ratios to the availability thresholds for the hierarchy levels in the selected spreading policy to determine whether the policy is met.

At block 1310, whether the selected spreading policy is met may be determined. For example, if the calculated availability values meet the corresponding threshold values in the selected spreading policy, then the spreading policy may be met based on the available storage pool reduced for the current blacklist and method 1300 may continue to block 1312. If the calculated availability values do not meet the corresponding threshold values in the selected spreading policy, then the spreading policy cannot be met based on the blacklisted storage resources and method 1300 may return to 1302 to select the next highest priority hierarchical spreading policy.

At block 1312, attempts to store the data blocks for the data element in the storage request may be made. For example, the block spreader may use a preliminary selection of storage elements made using the spreading policy to attempt storage operations for each of the data blocks or redundant data blocks corresponding to the data element.

At block 1314, a quantity of failures may be determined based on the storage attempts made at block 1312. For example, a failure checker may aggregate the failures received by the block spreader to determine additional unavailable storage elements beyond those identified by the blacklist. The number of failures may be quantified as a quantity of additional unavailable storage elements, storage system components, and/or storage paths at one or more hierarchy levels.

At block 1316, an updated availability percentage or ratio may be calculated for each hierarchy level in the selected spreading policy. For example, the availability calculator may use the total number of storage elements or system components at a hierarchy level and/or available through the relevant storage paths and divide the total value into the updated availability value after the quantity of failures are removed.

At block 1318, the updated availability percentage or ratio may be compared to the availability threshold for each hierarchy level in the selected spreading policy. For example, the availability calculator may compare the calculated availability percentages or ratios to the availability thresholds for the hierarchy levels in the selected spreading policy to determine whether the policy is met.

At block 1320, whether the selected spreading policy is met may be determined. For example, if the calculated availability values meet the corresponding threshold values in the selected spreading policy, then the spreading policy may be met based on the available storage pool reduced for the current blacklist and any failures and method 1300 in some cases, all data blocks may have been successfully stored at block 1312 and/or the block spreader may automatically attempt to store failed data blocks to other storage elements within the current spreading policy until the quantity of failures causes the policy to fail. Whenever the calculated availability values do not meet the corresponding threshold values in the selected spreading policy, then the spreading policy cannot be met based on the blacklisted and failed storage resources and method 1300 may return to 1302 to select the next highest priority hierarchical spreading policy.

Figure 14:
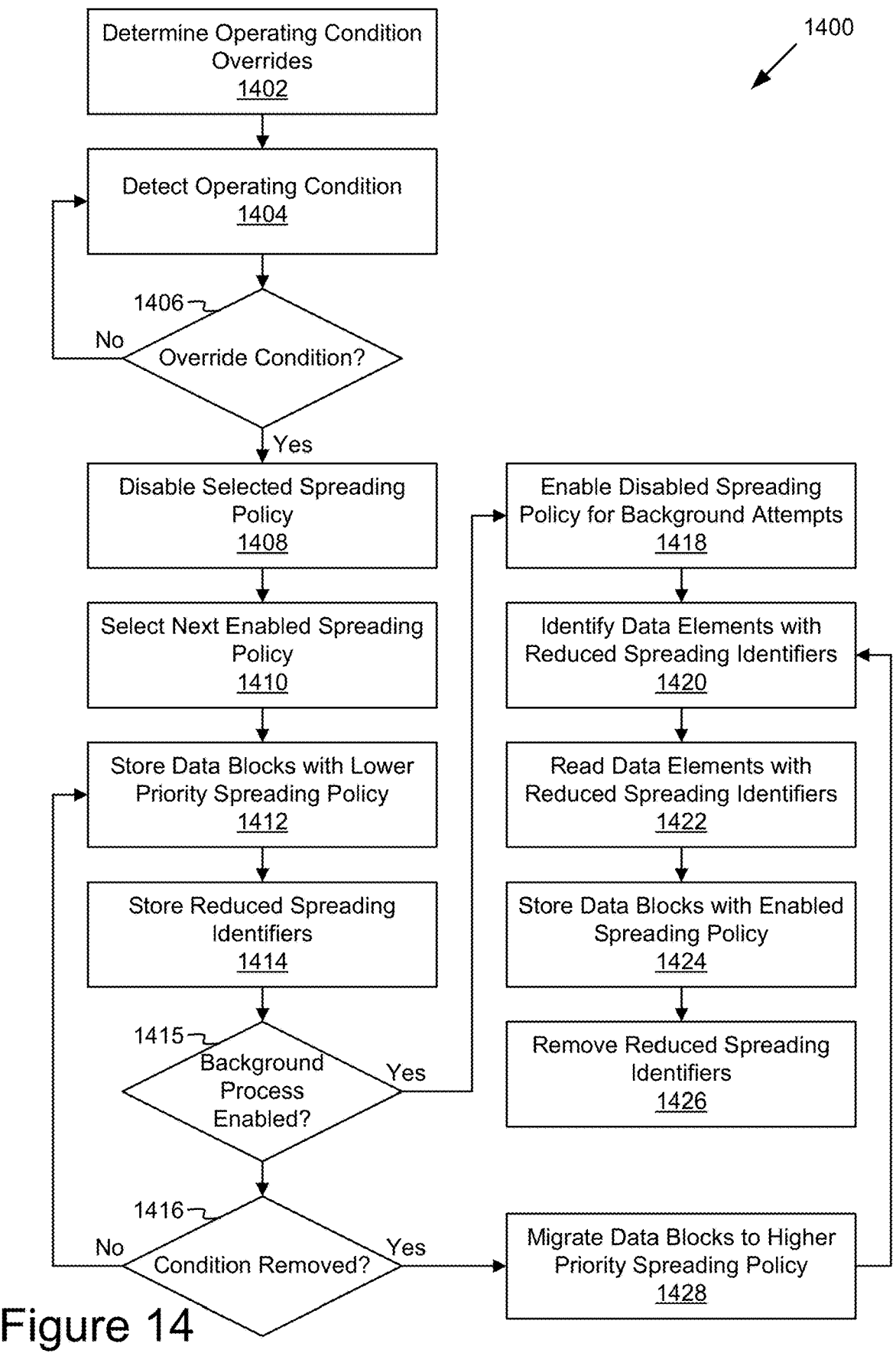
FIG. 14 is a flowchart of an example method of temporarily overriding a hierarchical spreading policy.

As shown in FIG. 14, the object storage system 500 may be operated according to an example method of temporarily overriding a hierarchical spreading policy, i.e. according to method 1400 illustrated by blocks 1402-1428 in FIG. 14.

At block 1402, one or more operating condition overrides may be determined. For example, a spreading policy manager may be used to define a number of operating conditions in which one or more priority levels may be temporarily suspended and the storage requests may be fulfilled with a lower priority hierarchical spreading policy, such as a system or subsystem repair or maintenance operation, a large data transfer or initial loading of a new storage system, a network or power disruption, or other operating states.

At block 1404, an operating condition determined at block 1402 may be detected. For example, the storage interface may include logic for detecting various operating states and notifying other components and may notify the storage policy engine of the change in operating condition. Alternatively, a user or other system resource may identify a relevant operating condition and notify the storage policy engine. At block 1406, if an override condition is fulfilled by a detected operating condition, method 1400 may proceed to block 1408. If no override condition is present in any detected operating condition, method 1400 may return to block 1404 to continue to monitor for changes in operating conditions.

At block 1408, one or more spreading policies may be disabled. For example, a spreading policy selector may disable hierarchical spreading policies indicated by the specific override condition from block 1406.

At block 1410, the next enabled spreading policy may be selected. For example, in response to a storage request, the spreading policy selector may bypass disabled spreading policies in priority order until an enabled spreading policy is identified and selected.

At block 1412, the data blocks corresponding to the storage request may be stored at the lower priority spreading policy forced by the disabled higher priority spreading policy. For example, the block spreader may select storage elements using the lower priority spreading policy and store the data blocks for the data objects received during the operating condition.

At block 1414, reduced spreading identifiers may be stored for the data elements or data blocks stored at the lower priority spreading policy. For example, a policy marker may store reduced spreading identifiers in metadata associated with the effected data elements or data blocks.

At block 1415, whether or not a background process is enabled for making attempts to migrate the data blocks to a higher priority spreading policy may be determined. If the background process is enabled, method 1400 may continue to block 1418 in parallel with continuing to block 1416.

At block 1416, whether or not the override condition has been removed may be determined. If the operating condition that triggered the override has ended, method 1400 may proceed to block 1428. If the operating condition that triggered the override has not ended, method 1400 may return to block 1412 and continue to handle storage requests with the lower priority hierarchical spreading policy.

At block 1418, the disabled spreading policy or policies may be enabled for background attempts to migrate data blocks to the disabled spreading policy. For example, the spreading policy selector may selectively re-enable any hierarchical spreading policies that were disabled responsive to the override condition specifically for background attempts to migrate the data blocks stored at lower priority spreading policies.

At block 1420, data elements with reduced spreading identifiers may be identified. For example, a spreading migrator may be initiated in response to the end of the override condition, as a background maintenance operation, and/or as triggered by a user and search the relevant metadata to identify any data elements and/or data blocks stored using the reduced spreading policy.

At block 1422, data elements with the reduced spreading identifiers may be read. For example, the spreading migrator may read the data elements with the reduced spreading identifiers from the storage elements selected under the lower priority spreading policy.

At block 1424, data elements read at block 1322 may be stored using the highest priority enabled spreading policy. For example, the spreading migrator may store the data elements using the normal prioritized hierarchical spreading policies without spreading policies disabled by the override condition, preferably resulting in the data elements being stored at a higher priority spreading policy.

At block 1426, reduced spreading identifiers may be removed from data elements stored at block 1424. For example, the spreading migrator may delete the metadata values for the reduced spreading identifiers once the data elements are stored at the highest priority spreading policy.

At block 1428, data blocks stored at a lower priority spreading policy may be migrated to a higher priority spreading policy. For example, responsive to the override condition being removed, the previously disabled spreading policies may be re-enabled for all storage requests and the spreading migrator may migrate the data blocks stored at lower priority spreading levels using foreground or background processes, while new storage requests may also be processed using the higher priority spreading policy in the foreground.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A storage system, comprising:
    a controller configured to:
        access a plurality of storage elements using a plurality of storage paths through a plurality of hierarchical system components;
        select, for a selected data element, a first hierarchical spreading policy from a plurality of hierarchical spreading policies for determining a subset of storage elements from the plurality of storage elements to store a plurality of data blocks corresponding to the selected data element;
        determine, for the selected data element, that the first hierarchical spreading policy has not been met;
        select, responsive to determining that the first hierarchical spreading policy has not been met, a second hierarchical spreading policy from the plurality of hierarchical spreading policies; and
        store, using the second hierarchical spreading policy, the plurality of data blocks corresponding to the selected data element to a selected subset of storage elements from the plurality of storage elements.

2. The storage system of claim 1, further comprising:
    an encoder configured to disassemble a data object into a predetermined number of redundant data blocks;
    a block spreader configured to distribute, using the second hierarchical spreading policy, the predetermined number of redundant data blocks to the plurality of storage elements;
    a block clusterer configured to retrieve a subset of the predetermined number of redundant data blocks from the plurality of storage elements; and
    a decoder configured to assemble the data object from the subset of the predetermined number of redundant data blocks.

3. The storage system of claim 1, further comprising:
    a storage policy engine configured to:
        store the plurality of hierarchical spreading policies; and
        assign a priority order for the plurality of hierarchical spreading policies, wherein the first hierarchical spreading policy has a higher priority order than the second hierarchical spreading policy.

4. The storage system of claim 3, wherein:
    the first hierarchical spreading policy corresponds to availability of the plurality of hierarchical system components at each hierarchy level of a plurality of hierarchy levels; and
    the second hierarchical spreading policy corresponds to downgraded availability of the plurality of hierarchical system components at a selected hierarchy level of the plurality of hierarchy levels.

5. The storage system of claim 4, wherein the plurality of hierarchical system components comprises at least two types of system components selected from:
    a storage node;
    a storage rack;
    a storage cluster;
    a storage site;
    a network switch;
    a network;
    a subnetwork; and
    a storage system.

6. The storage system of claim 3, wherein:
    the first hierarchical spreading policy corresponds to a percentage of available storage elements along a first set of storage paths from the plurality of storage paths;
    the second hierarchical spreading policy corresponds to a percentage of available storage elements along a second set of storage paths from the plurality of storage paths; and
    the second set of storage paths includes fewer storage paths than the first set of storage paths.

7. The storage system of claim 1, further comprising:
    a storage manager configured to:
        attempt to store the plurality of data blocks to the subset of storage elements selected from the plurality of storage elements; and
        determine a quantity of failed attempts to store the plurality of data blocks using the first hierarchical spreading policy, wherein the controller determines that the first hierarchical spreading policy has not been met based on the quantity of failed attempts meeting a policy failure threshold.

8. The storage system of claim 1, further comprising:
    a blacklist engine configured to identify blacklisted storage elements among the plurality of storage elements, wherein the controller determines that the first hierarchical spreading policy has not been met based on the blacklisted storage elements reducing the plurality of storage elements available below an availability threshold for the first hierarchical spreading policy.

9. The storage system of claim 8, wherein:
    the blacklist engine is further configured to identify blacklisted storage elements based on failure of hierarchical system components; and the controller determines that the first hierarchical spreading policy has not been met based on failure of at least one hierarchical system component reducing the plurality of hierarchical system components available at a selected hierarchy level below a hierarchical availability threshold for the first hierarchical spreading policy.

10. The storage system of claim 1, wherein the controller is further configured to:
disable, based on an operating condition, the first hierarchical spreading policy;
store, for each data element stored using the second hierarchical spreading policy, reduced spreading identifiers in metadata;
identify each data element with the reduced spreading identifier; and
migrate, using the first hierarchical spreading policy, each identified data element to an expanded subset of storage elements from the plurality of storage elements.

11. A computer-implemented method, comprising:
accessing a plurality of storage elements using a plurality of storage paths through a plurality of hierarchical system components;
selecting, for a selected data element, a first hierarchical spreading policy from a plurality of hierarchical spreading policies for determining a subset of storage elements from the plurality of storage elements to store a plurality of data blocks corresponding to the selected data element;
determining, for the selected data element, that the first hierarchical spreading policy has not been met;
selecting, responsive to determining that the first hierarchical spreading policy has not been met, a second hierarchical spreading policy from the plurality of hierarchical spreading policies; and
storing, using the second hierarchical spreading policy, the plurality of data blocks corresponding to the selected data element to a selected subset of storage elements from the plurality of storage elements.

12. The computer-implemented method of claim 11, further comprising:
storing the plurality of hierarchical spreading policies; and
assigning a priority order for the plurality of hierarchical spreading policies, wherein the first hierarchical spreading policy has a higher priority order than the second hierarchical spreading policy.

13. The computer-implemented method of claim 12, wherein:
the first hierarchical spreading policy corresponds to availability of the plurality of hierarchical system components at each hierarchy level of a plurality of hierarchy levels; and
the second hierarchical spreading policy corresponds to downgraded availability of the plurality of hierarchical system components at a selected hierarchy level of the plurality of hierarchy levels.

14. The computer-implemented method of claim 13, wherein the plurality of hierarchical system components comprises at least two types of system components selected from:
a storage node;
a storage rack;
a storage cluster;
a storage site;
a network switch;
a network;
a subnetwork; and
a storage system.

15. The computer-implemented method of claim 12, wherein:
the first hierarchical spreading policy corresponds to a percentage of available storage elements along a first set of storage paths from the plurality of storage paths;
the second hierarchical spreading policy corresponds to a percentage of available storage elements along a second set of storage paths from the plurality of storage paths; and
the second set of storage paths includes fewer storage paths than the first set of storage paths.

16. The computer-implemented method of claim 11, further comprising:
attempting to store the plurality of data blocks to the subset of storage elements selected from the plurality of storage elements; and
determining a quantity of failed attempts to store the plurality of data blocks using the first hierarchical spreading policy, wherein determining that the first hierarchical spreading policy has not been met is based on the quantity of failed attempts meeting a policy failure threshold.

17. The computer-implemented method of claim 11, further comprising:
identifying blacklisted storage elements among the plurality of storage elements, wherein determining that the first hierarchical spreading policy has not been met is based on the blacklisted storage elements reducing the plurality of storage elements available below an availability threshold for the first hierarchical spreading policy.

18. The computer-implemented method of claim 11, further comprising:
identifying blacklisted storage elements among the plurality of storage elements based on failure of hierarchical system components, wherein determining that the first hierarchical spreading policy has not been met is based on failure of at least one hierarchical system component reducing the plurality of hierarchical system components available at a selected hierarchy level below a hierarchical availability threshold for the first hierarchical spreading policy.

19. The computer-implemented method of claim 11, further comprising:
disabling, based on an operating condition, the first hierarchical spreading policy;
storing, for each data element stored using the second hierarchical spreading policy, reduced spreading identifiers in metadata;
identifying each data element with the reduced spreading identifiers; and
migrating, using the first hierarchical spreading policy, each identified data element to an expanded subset of storage elements from the plurality of storage elements.

20. A system, comprising:
a plurality of storage elements configured to store a plurality of data blocks;
a plurality of hierarchical system components configured to define a plurality of storage paths for accessing the plurality of storage elements;
means for accessing the plurality of storage elements using the plurality of storage paths through the plurality of hierarchical system components;
means for selecting, for a selected data element, a first hierarchical spreading policy from a plurality of hierarchical spreading policies for determining a subset of storage elements from the plurality of storage elements to store a plurality of data blocks corresponding to the selected data element;

means for determining, for the selected data element, that the first hierarchical spreading policy has not been met;

means for selecting, responsive to determining that the first hierarchical spreading policy has not been met, a second hierarchical spreading policy from the plurality of hierarchical spreading policies;

means for storing, using the second hierarchical spreading policy, the plurality of data blocks corresponding to the selected data element to a selected subset of storage elements from the plurality of storage elements; and means for migrating, using the first hierarchical spreading policy, the plurality of data blocks stored using the second hierarchical spreading policy.

* * * * *